US008593387B2

(12) United States Patent
Miyake

(10) Patent No.: US 8,593,387 B2

(45) Date of Patent: Nov. 26, 2013

(54) DISPLAY DEVICE, DRIVING METHOD OF THE SAME AND ELECTRONIC DEVICE

(75) Inventor: Hiroyuki Miyake, Kanagawa (JP)

(73) Assignee: Semiconductor Energy Laboratory Co., Ltd., Atsugi-shi, Kanagawa- ken (JP)

( * ) Notice: Subject to any disclaimer, the term of this patent is extended or adjusted under 35 U.S.C. 154(b) by 566 days.

(21) Appl. No.: 12/838,150

(22) Filed: Jul. 16, 2010

(65) Prior Publication Data

US 2011/0019098 A1 Jan. 27, 2011

(30) Foreign Application Priority Data

Jul. 22, 2009 (JP) ................................ 2009-171457

(51) Int. Cl.
*G09G 3/36* (2006.01)
*G09G 5/10* (2006.01)
*H04N 5/268* (2006.01)

(52) U.S. Cl.
USPC .............. 345/99; 345/100; 345/690; 348/705

(58) Field of Classification Search
USPC ........................................................... 345/99
See application file for complete search history.

(56) References Cited

U.S. PATENT DOCUMENTS 4,409,134 A 10/1983 Yamazaki
2009/0040245 A1* 2/2009 Hashimoto .................. 345/690

FOREIGN PATENT DOCUMENTS

JP 2004-309949 A 11/2004

* cited by examiner

*Primary Examiner* — Charles V Hicks
(74) *Attorney, Agent, or Firm* — Fish & Richardson P.C.

(57) ABSTRACT

A display device includes a pixel portion to which a non-inverted video signal is input in a first period and an inverted video signal is input in a second period, and a signal line driver circuit comprising a switch circuit portion for controlling output of the non-inverted video signal and the inverted video signal to the pixel portion. The switch circuit portion is controlled by a first signal serving as a first high power supply potential and a first low power supply potential in the first period and is controlled by a second signal serving as a second high power supply potential and a second low power supply potential in the second period, so that the switch circuit portion controls output of the non-inverted video signal and the inverted video signal to the pixel portion.

8 Claims, 14 Drawing Sheets

DISPLAY DEVICE, DRIVING METHOD OF THE SAME AND ELECTRONIC DEVICE

BACKGROUND OF THE INVENTION

1. Field of the Invention

The present invention relates to a display device, a driving method of the display device, and an electronic device including the display device.

2. Description of the Related Art

As large display devices such as liquid crystal televisions become widespread, higher added value is required for display devices and development thereof has been proceeded. Particularly, a technique to form a driver circuit or part of a driver circuit over a substrate, where a pixel portion is formed, using thin film transistors (TFTs) whose channel region is formed using an amorphous semiconductor or a microcrystalline semiconductor is actively developed because the technique greatly helps reduction in cost and improvement in reliability.

Instead of forming a signal line driver circuit (a source driver) over a substrate where a pixel portion is formed, in a display device using thin film transistors whose channel regions are formed using an amorphous semiconductor or a microcrystalline semiconductor, by using a technique called COG (chip on glass) or COF (chip on film), video signals are input from a driving IC through connection terminals which are provided as many as signal lines. The number of the connection terminals which are provided as many as the signal lines is increased as the number of the signal lines is increased, which causes a rise of cost. Patent Document 1 discloses a structure in which three analog switches included in a signal line driver circuit are provided over a substrate where a pixel portion is formed and one horizontal scanning period has three writing periods.

REFERENCE

Patent Document

[Patent Document 1] Japanese Published Patent Application No. 2004-309949

SUMMARY OF THE INVENTION

Here, a structure of FIG. 1A in Patent Document 1 is schematically illustrated in FIG. 14A. In FIG. 14A, reference symbols are given to a switch circuit portion 1406_1, a switch circuit portion 1406_2, thin film transistors 1407*a* to 1407*c* included in the switch circuit portion, a wiring 1408_2*n*−1 and a wiring 1408_2*n* (n is a given natural number) to which an image signal DATA_2*n*−1 and an image signal DATA_2*n* are supplied, and wirings 1409*a* to 1409*c* to which sampling signals R, G, and B are supplied. In addition, FIG. 14B illustrates a timing chart in which potential levels of a video signal in one gate selection period $T_m$ (m is a given natural number) and in one gate selection period $T_{m+1}$ and a given sampling signal (referred to as a signal R here) are shown together in periods T1 to T3. Note that the sampling signal has a state of a high power supply potential VH or a low power supply potential VL. When the sampling signal has a high power supply potential VH, a thin film transistor is brought into conduction and an image signal is supplied to a signal line side. When the sampling signal has a low power supply potential VL, the thin film transistor is brought out of conduction. Note that the video signal shown in FIG. 14B has a maximum potential level of VDH and a minimum potential level of 0 as a non-inverted video signal. Also, the video signal shown in FIG. 14B has a maximum potential level of 0 and a minimum potential level of VDL as an inverted video signal.

In the timing chart shown in FIG. 14B, regardless of whether the video signal DATA_2*n*−1 is a non-inverted video signal or an inverted video signal, the potential level of the sampling signal R is the high power supply potential VH in a period T1 of the period $T_m$. Also, regardless of whether the video signal DATA_2*n*−1 is a non-inverted video signal or an inverted video signal, the potential level of the sampling signal R is the low power supply potential VL in a period T2 of the period $T_m$. Also, regardless of whether the video signal DATA_2*n*−1 is a non-inverted video signal or an inverted video signal, the potential level of the sampling signal R is the low power supply potential VL in a period T3 of the period $T_m$. Also, regardless of whether the video signal DATA_2*n*−1 is a non-inverted video signal or an inverted video signal, the potential level of the sampling signal R is the high power supply potential VH in a period T1 of the period $T_{m+1}$. Also, regardless of whether the video signal DATA_2*n*−1 is a non-inverted video signal or an inverted video signal, the potential level of the sampling signal R is the low power supply potential VL in a period T2 of the period $T_{m+1}$. Also, regardless of whether the video signal DATA_2*n*−1 is a non-inverted video signal or an inverted video signal, the potential level of the sampling signal R is the low power supply potential VL in a period T3 of the period $T_{m+1}$. Similarly, turning on and off of the thin film transistor is controlled also by a sampling signal G and a sampling signal B. In this manner, a video signal is written to a selected pixel.

In the case where the thin film transistor 1407*a* is brought into conduction in the period T1 of the period $T_m$ a voltage between a gate and a source of the thin film transistor, that is, a difference between the high power supply potential VH which is a potential level applied to the gate of the thin film transistor and the potential level VDH which is the maximum potential level of the non-inverted video signal is Vgs3 in FIG. 14B. Also, in the case where the thin film transistor 1407*a* is brought out of conduction in the period T2 of the period $T_m$, a voltage between the gate and the source of the thin film transistor, that is, a difference between the low power supply potential VL which is a potential level applied to the gate of the thin film transistor and the potential level VDL which is the minimum potential level of the inverted video signal is Vgs4 in FIG. 14B. Also, in the case where the thin film transistor 1407*a* is brought out of conduction in the period T3 of the period $T_m$, a voltage between the gate and the source of the thin film transistor, that is, a difference between the low power supply potential VL which is a potential level applied to the gate of the thin film transistor and the potential level VDL which is the minimum potential level of the non-inverted video signal is Vgs5 in FIG. 14B. Also, in the case where the thin film transistor 1407*a* is brought into conduction in the period T1 of the period $T_{m+1}$, a voltage between the gate and the source of the thin film transistor, that is, a difference between the high power supply potential VH which is a potential level applied to the gate of the thin film transistor and a potential level of 0 which is the maximum potential level of the inverted video signal is Vgs6 in FIG. 14B. That is, a voltage applied between the gate and the source by application of a sampling signal to the gate of the thin film transistor differs in a period in which the video signal is an inverted video signal (referred to as a first period) and a period in which the video signal is a non-inverted video signal (referred to as a second period). Specifically, as in the case of Vgs3 and Vgs6 shown in FIG. 14B, a voltage applied between the gate and the source differs even in the case where the same thin film transistor 1407*a* is brought into conduction. In order to bring the thin film transistor 1407*a* into conduction, a voltage applied between the gate and the source needs to be high; therefore, a potential difference to some extent is logically required as Vgs3 shown in FIG. 14B. On the other hand, in the case of Vgs6 shown in FIG. 14B, a voltage is excessively applied between the gate and the source. In order to avoid insufficient charge and discharge in a signal line even in the case where the amount of current flowing through the thin film transistor becomes small because of shift of the threshold voltage of the thin film transistor due to the excessive voltage between the gate and the source, the thin film transistor needs to be designed large in advance. Also in the case where the thin film transistor 1407*a* is brought out of conduction, as a voltage applied between the gate and the source, a state of Vgs4 or a state of Vgs5 is employed and the thin film transistor needs to be designed large in advance.

In the structure disclosed by Patent Document 1, the size of the thin film transistor included in the analog switch of the signal line driver circuit needs to be large in advance so that the signal line sufficiently performs charge and discharge. Thus, a periphery of the pixel portion (a frame region) of the display device becomes large.

It is an object of one embodiment of the present invention to provide a display device in which a transistor forming an analog switch of a signal line driver circuit is small and charge and discharge of a signal line can be sufficiently performed and a driving method of the display device.

One embodiment of the present invention is a display device comprising a pixel portion to which a non-inverted video signal is input in a first period and to which an inverted video signal is input in a second period; and a signal line driver circuit comprising a switch circuit portion for controlling output of the non-inverted video signal and the inverted video signal to the pixel portion. The switch circuit portion is controlled by a first signal serving as a first high power supply potential and a first low power supply potential in the first period and is controlled by a second signal serving as a second high power supply potential and a second low power supply potential in the second period, so that the switch circuit portion controls output of the non-inverted video signal and the inverted video signal to the pixel portion.

In one embodiment of the present invention, the first high power supply potential may be higher than the second high power supply potential, and the first low power supply potential may be higher than the second low power supply potential.

In one embodiment of the present invention, the switch circuit portion comprises a thin film transistor, and a gate of the thin film transistor may be electrically connected to a wiring for supplying the first signal and the second signal.

In one embodiment of the present invention, the wiring is provided for each color element in a pixel of the pixel portion.

One embodiment of the present invention is a driving method of a display device including a pixel portion to which a non-inverted video signal is input in a first period and to which an inverted video signal is input in a second period; and a signal line driver circuit comprising a switch circuit portion for controlling output of the non-inverted video signal and the inverted video signal to the pixel portion. In the switch circuit portion, output of the non-inverted video signal and the inverted video signal to the pixel portion is controlled by a first signal serving as a first high power supply potential and a first low power supply potential and a second signal serving as a second high power supply potential and a second low power supply potential. The switch circuit portion is controlled by the first signal in the first period, and the switch circuit portion is controlled by the second signal in the second period.

In one embodiment of the present invention, the first high power supply potential may be higher than the second high power supply potential, and the first low power supply potential may be higher than the second low power supply potential.

In one embodiment of the present invention, the switch circuit portion comprises a thin film transistor, and the switch circuit portion may be controlled by a wiring electrically connected to a gate of the thin film transistor for supplying the first signal and the second signal.

In one embodiment of the present invention, the switch circuit portion may be controlled by a wiring provided for each color element in a pixel of the pixel portion.

In one embodiment of the present invention, the size of a transistor which forms an analog switch in a signal line driver circuit can be reduced and charge and discharge of a signal line can be adequately performed.

DETAILED DESCRIPTION OF THE INVENTION

Figure 1:
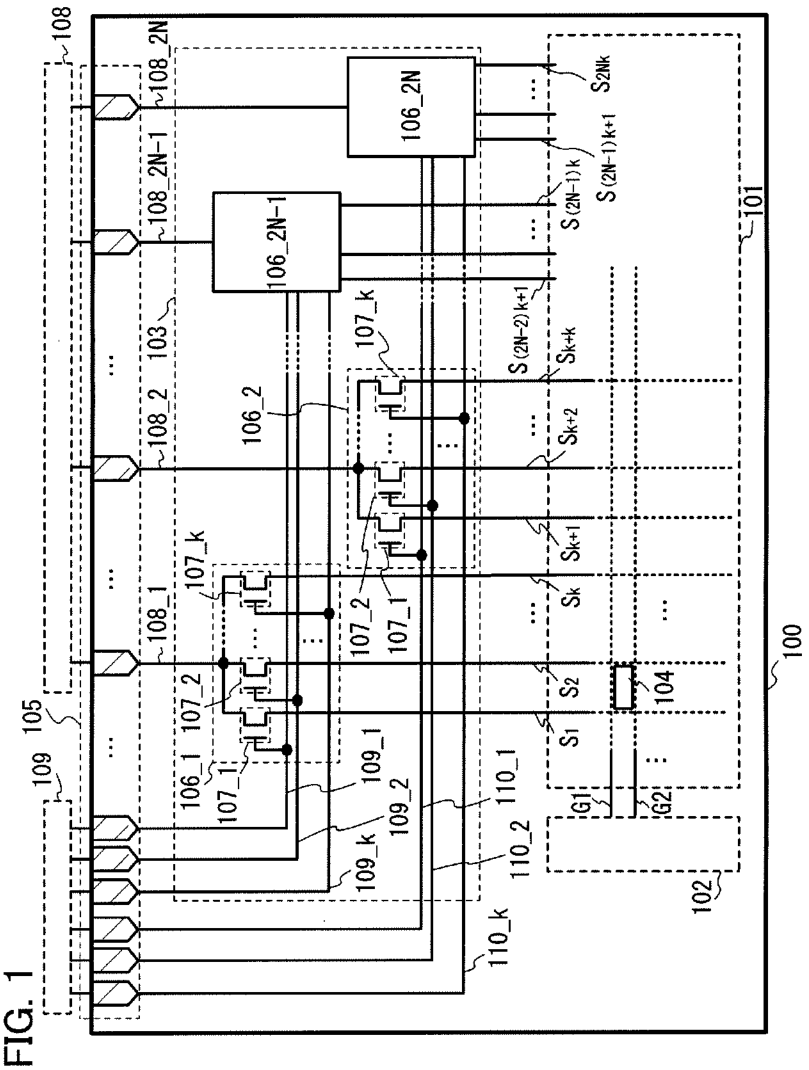
FIG. 1 is a block diagram of a circuit of a display device.

Hereinafter, embodiments of the present invention will be described with reference to the accompanying drawings. However, the embodiments can be implemented with various modes. It will be easily understood by those skilled in the art that modes and details can be changed in various ways without departing from the spirit and scope of the present invention. Therefore, this invention is not interpreted as being limited to the description of the embodiments below. Note that in structures of the invention described below, the same portions or portions having similar functions are denoted by the same reference numerals in different drawings, and description thereof is not repeated.

Note that the size, the thickness of a layer, distortion of the waveform of a signal, and a region of each structure illustrated in the drawings and the like in the embodiments are exaggerated for simplicity in some cases. Therefore, embodiments of the present invention are not limited to such scales.

Note that terms such as "first", "second", and "third" in this specification are used in order to avoid confusion among components, and the terms do not limit the components numerically.

Embodiment 1

In this embodiment, a structure of a display device and a driving method of the display device are described.

A structural example of a display device is described with reference to FIG. 1. The display device includes a pixel portion 101, a scan line driver circuit portion 102, and a signal line driver circuit portion 103 over a substrate 100.

Note that as the substrate 100, in addition to a glass substrate and a ceramic substrate, a plastic substrate or the like with heat resistance can be used.

In the pixel portion 101, a plurality of pixels is provided for intersection portions of scan lines and signal lines. Since video signals are supplied to respective pixels 104 through the signal lines in the pixel portion 101, an image with desired grayscale is displayed. In addition, a pixel electrode which is connected to a thin film transistor (TFT) and a display element is provided for each pixel. A gate electrode of the thin film transistor is connected to a scan line; one of electrodes serving as a source electrode and a drain electrode (a first terminal) of the thin film transistor is connected to a signal line; and the other of the electrodes serving as the source electrode and the drain electrode (a second terminal) of the thin film transistor is connected to the pixel electrode. Note that as the display element connected to the pixel electrode, a display element with a function of driving in which the polarity of an electric signal applied is inverted in a certain cycle may be employed. As an example, a liquid crystal display element is described.

Note that a thin film transistor is an element having at least three terminals of a gate, a drain, and a source. The thin film transistor has a channel region between a drain region and a source region, and current can flow through the drain region, the channel region, and the source region. Here, since the source and the drain of the thin film transistor may interchange depending on the structure, the operating condition, and the like of the thin film transistor, it is difficult to define which is a source or a drain. Therefore, a region functioning as source and drain is not called the source or the drain in some cases. In such a case, for example, one of the source and the drain may be referred to as a first terminal and the other thereof may be referred to as a second terminal. Alternatively, one of the source and the drain may be referred to as a first electrode and the other thereof may be referred to as a second electrode. Further alternatively, one of the source and the drain may be referred to as a first region and the other thereof may be referred to as a second region.

Note that a thin film transistor in this embodiment is a thin film transistor (TFT) formed using, specifically, amorphous silicon or microcrystalline (also referred to as microcrystal, nanocrystal, or semi-amorphous) silicon for a channel region. Specifically, in the case where microcrystalline (also referred to as microcrystal, nanocrystal, or semi-amorphous) silicon is used for a channel region of the thin film transistor, a driver circuit in which the degree of deterioration of the thin film transistor is low can be obtained.

Note that when it is explicitly described that "A and B are connected," the case where A and B are electrically connected, the case where A and B are functionally connected, and the case where A and B are directly connected are included therein. Here, each of A and B corresponds to an object (e.g., a device, an element, a circuit, a wiring, an electrode, a terminal, a conductive film, or a layer). Accordingly, another connection relation is included without being limited to a predetermined connection relation, for example, the connection relation shown in the drawings and the texts.

The scan line driver circuit portion 102 outputs scan signals to a plurality of scan lines which extends to the pixel portion. In FIG. 1, although the scan line driver circuit portion 102 is provided over the substrate 100, part or all of functions of the scan line driver circuit may be provided outside the substrate 100. In addition, although not shown, signals for driving the scan line driver circuit, such as a clock signal (GCK) and a start pulse (GSP), are input to the scan line driver circuit portion 102 through an external connection terminal 105.

The signal line driver circuit portion 103 includes a plurality of switch circuit portions 106_1 to 106_2N (N is a natural number). The switch circuit portions 106_1 to 106_2N each include a plurality of thin film transistors 107_1 to 107_$k$ (k is a natural number). The thin film transistors 107_1 to 107_$k$ have the same conductivity as a thin film transistor of the pixel 104 and a thin film transistor of the scan line driver circuit portion 102. Note that in FIG. 1, the switch circuit portions 106_1 to 106_2N are separately shown as the odd-numbered switch circuit portions 106_1 to 106_2N−1 and the even-numbered switch circuit portions 106_2 to 106_2N.

Connection relation of the signal line driver circuit portion 103 is described with the switch circuit portion 106_1 and the switch circuit portion 106_2 as an example. First terminals of the thin film transistors 107_1 to 107_$k$ in the switch circuit portion 106_2N−1 are connected to a wiring 108_2N−1. Second terminals of the thin film transistors 107_1 to 107_$k$ in the switch circuit portion 106_2N−1 are connected to wirings $S_{(2N-2)k+1}$ to $S_{(2N-1)k}$, respectively. Gates of the thin film transistors 107_1 to 107_$k$ in the switch circuit portion 106_2N−1 are connected to wirings 109_1 to 109_$k$, respectively. For example, the first terminal of the thin film transistor 107_1 in the switch circuit portion 106_1 is connected to the wiring 108_1; the second terminal of the thin film transistor 107_1 in the switch circuit portion 106_1 is connected to the wiring $S_1$; and the gate of the thin film transistor 107_1 in the switch circuit portion 106_1 is connected to the wiring 109_1. In addition, first terminals of the thin film transistors 107_1 to 107_$k$ in the switch circuit portion 106_2N are connected to a wiring 108_2N. Second terminals of the thin film transistors 107_1 to 107_$k$ in the switch circuit portion 106_2N are connected to wirings $S_{(2N-1)k+1}$ to $S_{2Nk}$, respectively. Gates of the thin film transistors 107_1 to 107_$k$ in the switch circuit portion 106_2N are connected to wirings 110_1 to 110_$k$, respectively. For example, the first terminal of the thin film transistor 107_1 in the switch circuit portion 106_2 is connected to the wiring 108_2; the second terminal of the thin film transistor 107_1 in the switch circuit portion 106_2 is connected to the wiring $S_{k+1}$; and the gate of the thin film transistor 107_1 in the switch circuit portion 106_2 is connected to the wiring 110_1.

Note that structures of the thin film transistors 107_1 to 107_$k$ can employ various modes without being limited to a specific structure. For example, a multi-gate structure having two or more gate electrodes can be used.

As another example of the structures of the thin film transistors 107_1 to 107_$k$, a structure where gate electrodes are formed above and below a channel region can be used. Note that the structure where gate electrodes are formed above and below a channel region is substantially equivalent to a structure where a plurality of thin film transistors is connected in parallel.

As another example of the structures of the thin film transistors 107_1 to 107_*k*, a structure where a gate electrode is formed above a channel region, a structure where a gate electrode is formed below a channel region, a staggered structure, an inverted staggered structure, a structure where a channel region is divided into a plurality of regions, or a structure where channel regions are connected in parallel or in series can be used. Further alternatively, a structure where a source electrode or a drain electrode overlaps with a channel region (or part of it) can be used.

A sampling signal output circuit 109 has a function of, through the external connection terminal 105, supplying sampling signals to the switch circuit portions 106_1 to 106_2N−1 through the wirings 109_1 to 109_*k* and to the switch circuit portions 106_2 to 106_2N through the wirings 110_1 to 110_*k*. As the sampling signals output from the sampling signal output circuit 109, a first signal which is to be a first high power supply potential and a first low power supply potential and a second signal which is to be a second high power supply potential and a second low power supply potential are alternately output. Note that the first high power supply potential is higher than the second high power supply potential and the first low power supply potential is higher than the second low power supply potential. The given number of wirings 109_1 to 109_*k* and wirings 110_1 to 110_*k* may be provided; however, for example, the wirings 109_1 to 109_*k* and wirings 110_1 to 110_*k* are preferably provided for respective color elements in the pixel 104 of the pixel portion 101 and the number of color elements is preferably equal to k. For example, in the case where color display is performed with the use of an additive color mixture by color elements of R (red), G (green), and B (blue), the wirings 109_1, 109_2, and 109_3 and the wirings 110_1, 110_2, and 110_3 are preferably provided. In addition, by making k the same as the number of color elements or multiples thereof, visibility with the additive color mixture can be increased. Note that color elements are not limited to R, G and B and may be cyan, magenta, and yellow. Alternatively, four color elements may be used by adding white to R, G, and B.

Note that a plurality of power supply potentials supplied from the sampling signal output circuit 109 may be supplied alternately to the wirings 109_1 to 109_*k* and the wirings 110_1 to 110_*k* which extend to the respective switch circuit portions 106_1 to 106_2N by controlling an analog switch or the like in the sampling signal output circuit 109.

A video signal output circuit 108 has a function of outputting video signals to the switch circuit portions 106_1 to 106_2N through the external connection terminal 105. For example, the video signal output circuit 108 supplies a video signal to the switch circuit portion 106_1 through the external connection terminal 105 and the wiring 108_1. In addition, the video signal output circuit 108 supplies a video signal to the switch circuit portion 106_2 through the wiring 108_2. The video signal is an analog signal in many cases. Note that in the case where a liquid crystal display element is employed as a display element described in this embodiment, inversion driving is required. In that case, as a video signal output from the video signal output circuit 108, non-inverted video signals and inverted video signals whose polarities are different from each other are alternately output in every predetermined period.

Note that in the case where the sampling signal output circuit 109 and the video signal output circuit 108 are formed outside the substrate 100, the sampling signal output circuit 109 and the video signal output circuit 108 can be mounted on an FPC (flexible printed circuit) which is connected to the external connection terminal 105 by TAB (tape automated bonding). Alternatively, the sampling signal output circuit 109 and the video signal output circuit 108 can be mounted on the substrate 100 by COG (chip on glass).

The switch circuit portions 106_1 to 106_2N each have a function of selecting a wiring, to which a non-inverted video signal or an inverted video signal from the video signal output circuit 108 is output, by using the thin film transistors 107_1 to 107_*k*. For example, the switch circuit portion 106_1 has a function of selecting a wiring, to which an inverted video signal or a non-inverted video signal is output from the video signal output circuit 108 through the wiring 108_1, from the wirings $S_1$ to $S_k$. For the selection, a first signal or a second signal supplied from the wirings 109_1 to 109_*k* and the wirings 110_1 to 110_*k* is used.

The respective thin film transistors 107_1 to 107_*k* included in the switch circuit portions 106_1 to 106_2N have functions of controlling electrical continuity and non electrical continuity between the wiring 108_1 and the respective wirings $S_1$ to $S_k$, in accordance with the first signal or the second signal that are sampling signals from the sampling signal output circuit 109.

Figure 2A:
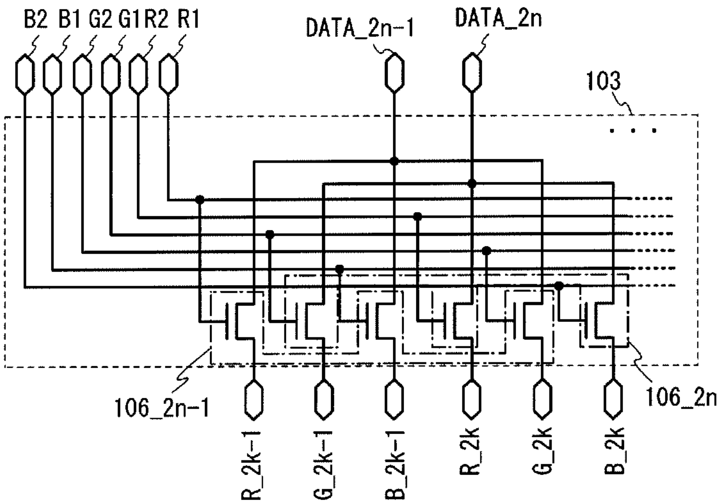
FIGS. 2A and 2B are diagrams illustrating a driver circuit portion of a display device.
Figure 2B:
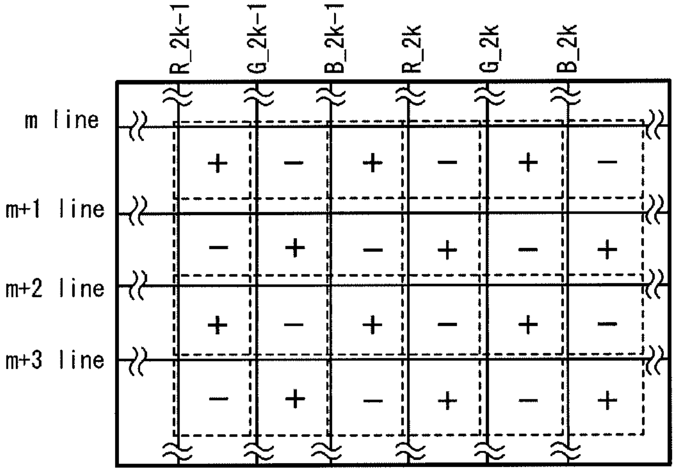

Next, in order to describe operation of the signal line driver circuit in FIG. 1, FIG. 2A illustrates a specific circuit example and FIG. 2B illustrates one example of a video signal to be output to the pixel portion. Operation of the signal line driver circuit in FIG. 1 is described in detail with reference to FIG. 3 and FIG. 4. Note that in FIGS. 2A and 2B, FIG. 3, and FIG. 4, color elements in the pixel 104 of the pixel portion 101 are R, and B. In addition, to wirings corresponding to the wirings 109_1, 109_2, and 109_2, and wirings 110_1, 110_2, and 110_3 in FIG. 1, for example, a sampling signal R1 which is related to R, a sampling signal R2 which is related to R, a sampling signal G1 which is related to G, a sampling signal G2 which is related to G, a sampling signal B1 which is related to B, and a sampling signal B2 which is related to B are supplied. In addition, thin film transistors to which the sampling signal R1, the sampling signal G1, the sampling signal B1, the sampling signal R2, the sampling signal G2, and the sampling signal B2 are supplied are connected to signal lines R_2*k*−1, G_2*k*−1, B_2*k*−1, R_2*k*, G_2*k*, and B_2*k* (k is a given natural number), respectively. Video signal DATA_2*n*−1 and a video signal DATA_2*n* (n is a given natural number) are supplied to wirings corresponding to the wirings 108_1 to 108_2N in FIG. 1, taking these two wirings into an example.

Note that in this embodiment, an example of operation of the signal line driver circuit portion 103 provided with the signal lines R_2*k*−1, G_2*k*−1, B_2*k*−1, R_2*k*, G_2*k*, and B_2*k* and scan lines m, m+1, m+2, and m+3 (in is a given, natural number) as shown in FIG. 2B is described. In FIG. 2B, symbols + and − given to intersection portions of the scan lines and the signal lines show whether the video signal input to the pixel is an inverted video signal or a non-inverted video signal. An example in FIG. 2B shows input of an image signal in one period in so-called dot inversion driving. For example, a non-inverted image signal is supplied to a pixel to which an image signal and a scan signal are supplied from the signal line R_2*k*−1 and the scan line in. In addition, an inverted image signal is supplied to a pixel to which an image signal and a scan signal are supplied from the signal line G_2*k*−1 and the scan line m. Moreover, an inverted image signal is supplied to a pixel to which an image signal and a scan signal are supplied from the signal line R_2*k*−1 and the scan line m+1. Note that in FIG. 2B, an example in which pixels corresponding to color elements of R, G and B are arranged in stripes is shown; however, another arrangement such as delta arrangement may be employed.

Note that in FIG. 2B, although the case where an image signal is input in dot inversion driving is shown, an image signal can be input in accordance with a driving method other than dot inversion driving: source line inversion driving, gate line inversion driving, frame inversion driving, or the like.

Figure 3:
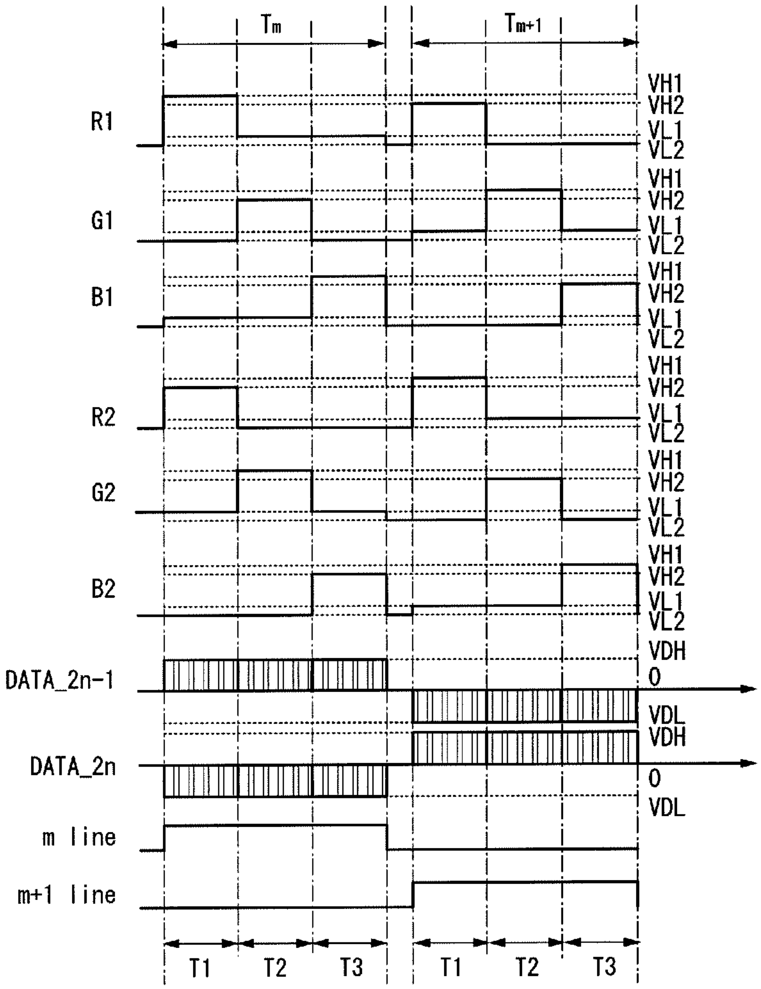
FIG. 3 is a timing chart illustrating a driver circuit portion of a display device.

FIG. 3 is a timing chart related to the potentials of the sampling signal R1, the sampling signal R2, the sampling signal G1, the sampling signal G2, the sampling signal B1, the sampling signal B2, the video signal DATA_2$n$−1, the video signal DATA_2$n$, a scan signal (m line) of the scan line m, and a scan signal (m+1 line) of the scan line m+1. Note that a period $T_m$ and a period $T_{m+1}$ in FIG. 3 each correspond to one gate selection period in a display device. One gate selection period is a period in which pixels in one row are selected and video signals are written to the pixels. In FIG. 3, one gate selection period is a period in which the scan signal (m line) or the scan signal (m+1 line) has a high power supply potential (VDD). Note that the scan signal has a low power supply potential (VSS) in a period except the period in which the scan signal has the high power supply potential (VDD). In addition, the period $T_m$ and the period $T_{m+1}$ in FIG. 3 are each divided into periods T1 to Tk. Note that in an example shown in this embodiment, since color elements are R, G, and B and k equals 3, the period $T_m$ and the period $T_{m+1}$ are each divided into the periods T1, T2, and T3. In each of the periods T1, T2, and T3, video signals are written to pixels that belong to a selected row. Note that another period may be provided before the period T1. In addition, the sampling signal R1, the sampling signal R2, the sampling signal G1, the sampling signal G2, the sampling signal B1, and the sampling signal B2 each have a first high power supply potential VH1, a second high power supply potential VH2, a first low power supply potential VL1, and a second low power supply potential VL2. In addition, as shown in FIG. 3, the video signal DATA_2$n$−1 and the video signal DATA_2$n$ are set to have a maximum potential level of VDH and have a minimum potential level of 0 (also referred to as a reference potential or GND) in the case where the video signal is a non-inverted video signal. Moreover, the video signal DATA_2$n$−1 and the video signal DATA_2$n$ are set to have a maximum potential level of 0 and a minimum potential level of VDL in the case where the video signal is an inverted video signal. Note that a period in which a non-inverted video signal is supplied as a video signal to each transistor in each switch circuit is referred to as a first period and a period in which an inverted video signal is supplied as a video signal to each transistor in each switch circuit is referred to as a second period. Therefore, whether each of pixels in the pixel portion is in the first period or the second period differs in each of the pixels. Specifically, as described above, in dot inversion driving, the first period and the second period are switched in each of the periods T1, T2, and T3; in gate line inversion driving or source line inversion driving, the first period and the second period are switched in every line; and in frame inversion driving, the first period and the second period are switched in every frame period.

Note that although this embodiment illustrates an example in which video signals related to R, G, and B are output in order of R, G, and B, the order is arbitrary and can be changed as appropriate.

In FIG. 3, the potential level of the sampling signal R1 in the period T1 of the period $T_m$ is the first high power supply potential VH1. The potential level of the sampling signal R1 in the period T2 of the period $T_m$ is the first low power supply potential VL1. The potential level of the sampling signal R1 in the period T3 of the period $T_m$ is the first low power supply potential VL1. The potential level of the sampling signal R1 in the period T1 of the period $T_{m+1}$ is the second high power supply potential VH2. The potential level of the sampling signal R1 in the period T2 of the period $T_{m+1}$ is the second low power supply potential VL2. The potential level of the sampling signal R1 in the period T3 of the period $T_{m+1}$ is the second low power supply potential VL2. In addition, although description is omitted, the signal line driver circuit portion 103 operates by switching the potentials of the sampling signals G1, B1, R2, G2, and B2 in each of the periods T1 to T3 as shown in FIG. 3. In addition, each of the video signal DATA_2$n$−1 and the video signal DATA_2$n$ repeatedly turns to a non-inverted video signal and an inverted video signal alternately in every one gate selection period. Moreover, the scan signal (m line) of the scan line m has a high power supply potential in the period T and the scan signal (m+1 line) of the scan line m+1 has a high power supply potential in the period $T_{m+1}$.

Figure 4:
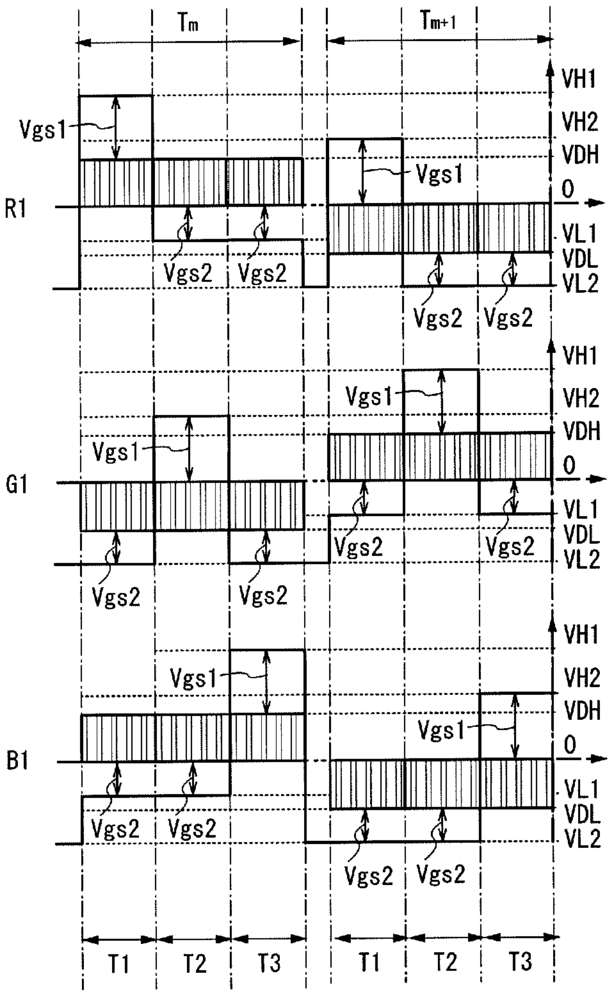
FIG. 4 is a timing chart illustrating a driver circuit portion of a display device.

Next, FIG. 4 illustrates a timing chart in which the image signal DATA_2$n$−1 is shown together with the sampling signals R1, G1, and B1 in the timing chart of FIG. 3 and advantages of this embodiment based on the level of the potential of each signal are described in detail. Note that in the timing chart of FIG. 4, as described in FIG. 3, since the video signal DATA_2$n$−1 is a non-inverted video signal in the period T1 of the period $T_m$, the potential level of the sampling signal R1 is the first high power supply potential VH1. In addition, since the video signal DATA_2$n$−1 is an inverted video signal in the period T1 of the period $T_m$, the potential level of the sampling signal G1 is the second low power supply potential VL2. Moreover, since the video signal DATA_2$n$−1 is a non-inverted video signal in the period T1 of the period $T_m$, the potential level of the sampling signal B1 is the first low power supply potential VL1. Accordingly, the thin film transistor 107_1 is turned on, whereby the wiring 108_1 and the wiring $S_1$ are brought into electrical continuity. In addition, the thin film transistor 107_2 and the thin film transistor 107_3 are turned off, whereby the wiring 108_2 and the wiring $S_2$ are brought out of electrical continuity and the wiring 108_3 and the wiring $S_3$ are brought out of electrical continuity. In this manner, the video signal DATA_2$n$−1 is written to, among pixels that are connected to the wiring $S_1$, a pixel that belongs to a selected mth row in the period T1 of the period $T_m$.

In the case where the thin film transistor 107_1 is brought into conduction in the period T1 of the period $T_m$, a voltage applied between a gate and a source of the thin film transistor, that is, a difference between the first high power supply potential VH1 which is a potential level applied to the gate of the thin film transistor and the potential level VDH which is the maximum potential level of the non-inverted video signal is Vgs1. Also, in the case where the thin film transistor 107_1 is brought out of conduction in the period T1 of the period $T_m$, a voltage applied between the gate and the source of the thin film transistor, that is, a difference between the first low power supply potential VL1 which is a potential level applied to the gate of the thin film transistor and the potential level 0 which is the minimum potential level of the non-inverted video signal is Vgs2.

Note that voltage means a potential difference between one potential and reference potential (e.g., ground potential) in many cases. Therefore, in this specification, a voltage and a potential can be interchanged with each other for explanation.

In addition, also in the periods T2 and T3 of the period $T_m$, like in the period T1 of the period $T_m$, voltage Vgs1 is applied when the gate and the source of the thin film transistor are brought into electrical continuity and a voltage Vgs2 is applied when the gate and the source of the thin film transistor are brought out of electrical continuity, so that a video signal is written to a predetermined pixel. Note that in a period when the video signal has the first low power supply potential VL1 in FIG. 3 and FIG. 4, the first low power supply potential VL1 may be replaced with the second low power supply potential VL2 as long as the thin film transistor is out of conduction. Note that as shown in FIG. 3 and FIG. 4, when the video signal has the first low power supply potential VL1 in the first period and has the second low power supply potential VL2 in the second period, a voltage applied between the gate and the source when the thin film transistor is brought out of conduction can be constant.

In the period T1 of the period $T_{m+1}$, the potential level of the sampling signal R1 is the second high power supply potential VH2 because the video signal DATA_2n−1 is an inverted video signal. In addition, in the period T1 of the period $T_{m+1}$, the potential level of the sampling signal G1 is the first low power supply potential VL1 because the video signal DATA_2n−1 is a non-inverted video signal. Moreover, in the period T1 of the period $T_{m+1}$, the potential level of the sampling signal B1 is the second low power supply potential VL2 because the video signal DATA_2n−1 is an inverted video signal. As a result, like in the period T1 of the period $T_m$, the thin film transistor 107_1 is turned on, so that the wiring 108_1 and the wiring $S_1$ are brought into electrical continuity. Further, like in the period T1 of the period $T_m$, the thin film transistor 107_2 and the thin film transistor 107_3 are turned off, so that the wiring 108_2 and the wiring $S_2$ are brought out of electrical continuity and the wiring 108_3 and the wiring $S_3$ are brought out of electrical continuity. In this manner, the video signal DATA_2n−1 is written to, among pixels that are connected to the wiring $S_1$, a pixel that belongs to a selected (m+1)th row in the period T1 of the period $T_{m+1}$.

In the case where the thin film transistor 107_1 is brought into conduction in the period T1 of the period $T_{m+1}$, a voltage applied between the gate and the source of the thin film transistor, that is, a difference between the second high power supply potential VH2 which is a potential level applied to the gate of the thin film transistor and the potential level 0 which is the maximum potential level of the inverted video signal is Vgs1. In addition, in the case where the thin film transistor 107_1 is brought out of conduction in the period T1 of the period $T_{m+1}$, a voltage applied between the gate and the source of the thin film transistor, that is, a difference between the second low power supply potential VL2 which is a potential level applied to the gate of the thin film transistor and the potential level VDL which is the minimum potential level of the inverted video signal is Vgs2. In other words, in the period $T_m$ and the period $T_{m+1}$ which are different from each other, a voltage applied between the gate and the source of the thin film transistor is Vgs1 when the thin film transistor is on and a voltage applied between the gate and the source of the thin film transistor is Vgs2 when the thin film transistor is off, so that the potential of each sampling signal is adjusted.

In addition, also in the periods T2 and T3 of the period $T_{m+1}$, like in the period T1 of the period $T_{m+1}$, a voltage Vgs1 is applied when the gate and the source of the thin film transistor are brought into electrical continuity and a voltage Vgs2 is applied when the gate and the source of the thin film transistor are brought out of electrical continuity, so that a video signal is written to a predetermined pixel.

Figure 14A:
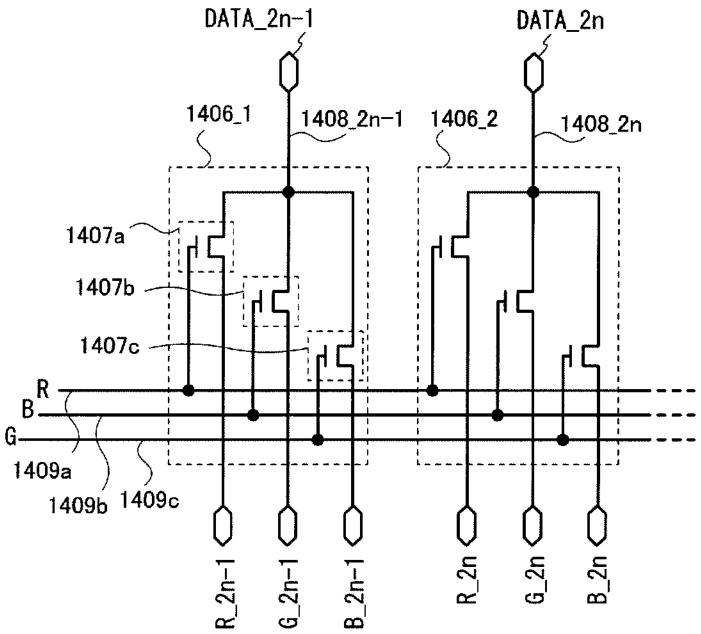
FIGS. 14A and 14B are diagrams illustrating a driver circuit portion of a display device.
Figure 14B:
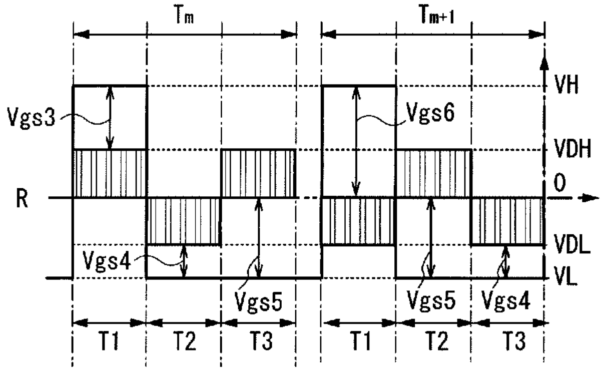

In the structure of the signal line driver circuit of the display device illustrated in FIG. 1, FIGS. 2A and 2B, FIG. 3, and FIG. 4, supply of the video signal to the pixel portion can be controlled as follows; unlike in the above-described structure in FIGS. 14A and 14B, when a non-inverted video signal and an inverted video signal are input to the pixel portion in the first period and the second period, respectively, a first signal serving as the first high power supply potential and the first low power supply potential is supplied to the thin film transistor of the switch circuit portion in the first period; and a second signal serving as the second high power supply potential and the second low power supply potential is supplied to the thin film transistor of the switch circuit portion in the second period. Therefore, in the case where a display element that requires inversion driving, such as a liquid crystal display element, is used, a voltage applied between the gate and the source of the thin film transistor of the switch circuit portion can be constant. Thus, it is not necessary that the size of the transistor be large in consideration of a decrease in current flowing to the thin film transistor due to a shift of the threshold voltage of the thin film transistor which is caused by a voltage excessively applied. That is, a thin film transistor included in an analog switch of the signal line driver circuit can be made small and charge and discharge of the signal line can be adequately performed.

As another example, dot inversion driving is described with reference to FIGS. 5A and 5B, FIG. 6, and FIG. 7 like in FIGS. 2A and 2B, FIG. 3, and FIG. 4.

Figure 5A:
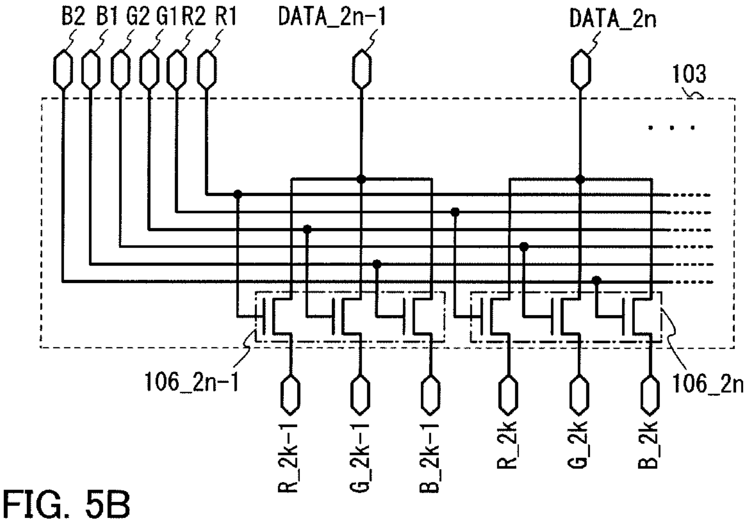
FIGS. 5A and 5B are diagrams illustrating a driver circuit portion of a display device.
Figure 5B:
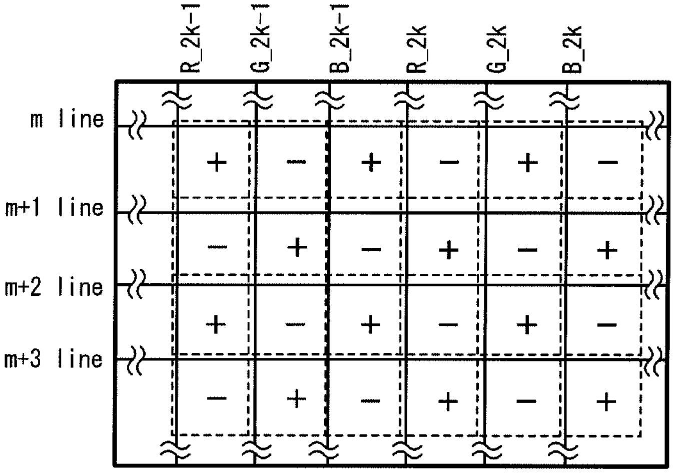

First, FIG. 5A illustrates a specific circuit example like FIG. 2A and FIG. 5B illustrates one example of a video signal output to the pixel portion like FIG. 2B. Operation of the circuit is described in detail with reference to FIG. 6 and FIG. 7 like FIG. 3 and FIG. 4. Note that FIG. 5A is different from FIG. 2A in that connection relation of wirings to which video signals are input is different and description thereof is omitted.

Note that in this embodiment, an example of operation of the signal line driver circuit portion 103 provided with the signal lines R_2k−1, G_2k−1, B_2k−1, R_2k, G_2k, and B_2k and scan lines m, m+1, m+2, and m+3 (m is a given natural number) as shown in FIG. 5B is described. In FIG. 5B, symbols + and − given to intersection portions of the scan lines and the signal lines show whether a video signal input to a pixel is an inverted video signal or a non-inverted video signal. An example in FIG. 5B shows input of an image signal in one period in so-called dot inversion driving.

Figure 6:
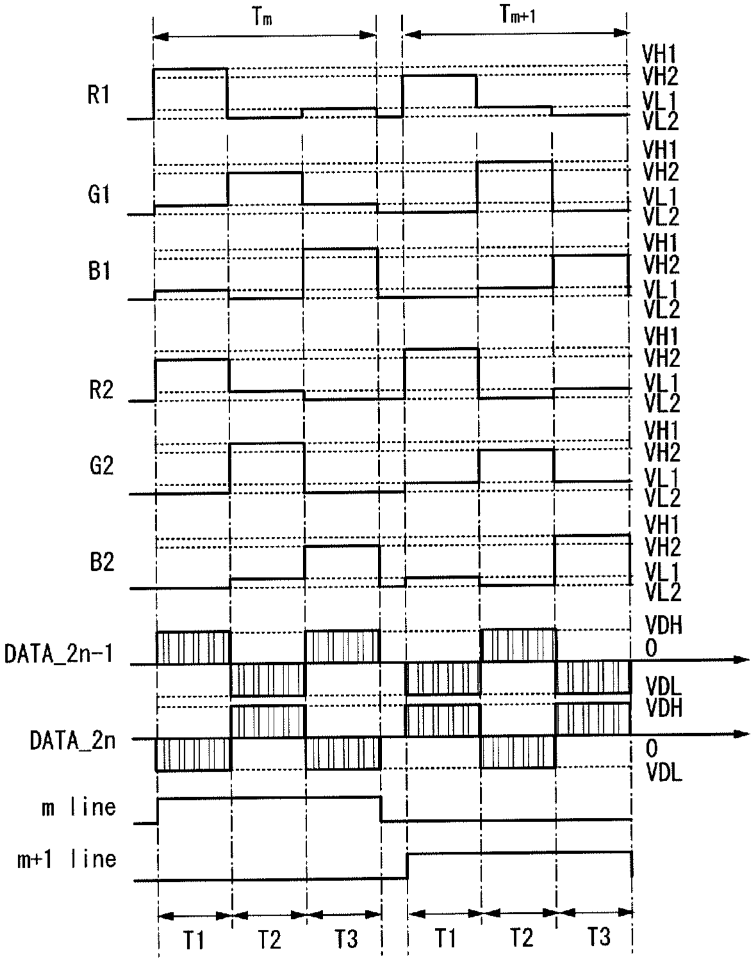
FIG. 6 is a timing chart illustrating a driver circuit portion of a display device.

FIG. 6 is a timing chart related to the potentials of a sampling signal R1, a sampling signal R2, a sampling signal G1, a sampling signal G2, a sampling signal B1, a sampling signal B2, a video signal DATA_2n−1, a video signal DATA_2n, a scan signal (m line) of the scan line m, and a scan signal (m+1 line) of the scan line m+1 in FIG. 5A like in FIG. 3. Note that a period $T_m$ and a period $T_{m+1}$ in FIG. 6 each correspond to one gate selection period in a display device. In addition, the sampling signal R1, the sampling signal R2, the sampling signal G1, the sampling signal G2, the sampling signal B1, and the sampling signal B2 each have a first high power supply potential VH1, a second high power supply potential VH2, a first low power supply potential VL1, and a second low power supply potential VL2 like in FIG. 3. In addition, as shown in FIG. 6, the video signal DATA_2n−1 and the video signal DATA_2n are set to have a maximum potential level of VDH and have a minimum potential level of 0 (also referred to as a reference potential or GND) in the case where the video signal is a non-inverted video signal. Moreover, the video signal DATA_2n−1 and the video signal DATA_2n are set to have a maximum potential level of 0 and a minimum potential level of VDL in the case where the video signal is an inverted video signal. Note that a period in which a non-inverted video signal is supplied as a video signal to each transistor in each switch circuit is referred to as a first period and a period in which an inverted video signal is supplied as a video signal to each transistor in each switch circuit is referred to as a second period.

In FIG. 6, the potential level of the sampling signal R1, in the period T1 of the period $T_m$ is the first high power supply potential VH1. The potential level of the sampling signal R1 in the period T2 of the period $T_m$ is the second low power supply potential VL2. The potential level of the sampling signal R1 in the period T3 of the period $T_m$ is the first low power supply potential VL1. The potential level of the sampling signal R1 in the period T1 of the period $T_m$ is the second high power supply potential VH2. The potential level of the sampling signal R1 in the period T2 of the period $T_{m+1}$ is the first low power supply potential VL1. The potential level of the sampling signal R1 in the period T3 of the period $T_{m+1}$ is the second low power supply potential VL2. In addition, although description is omitted, the signal line driver circuit portion 103 operates by switching the potentials of the sampling signals G1, B1, R2, G2, and B2 in each of the periods T1 to T3 as shown in FIG. 6. In addition, each of the video signal DATA_2$n$−1 and the video signal DATA_2$n$ repeatedly turns to a non-inverted video signal and an inverted video signal alternately in each of the periods T1 to T3. Moreover, the scan signal (m line) of the scan line m has a high power supply potential in the period $T_m$ and the scan signal (m+1 line) of the scan line m+1 has a high power supply potential in the period $T_{m+1}$.

Figure 7:
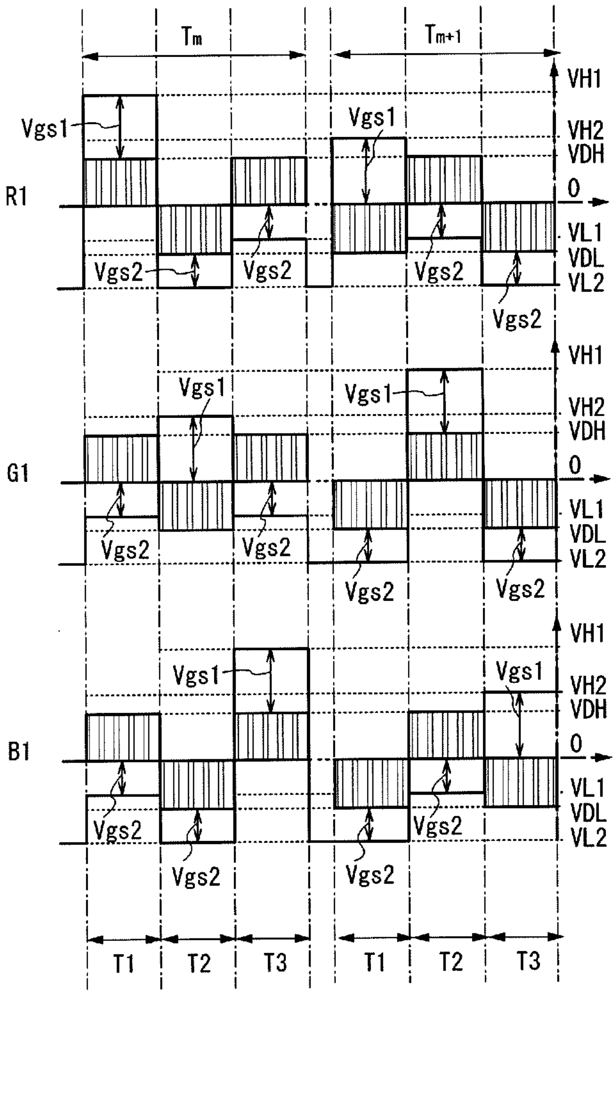
FIG. 7 is a timing chart illustrating a driver circuit portion of a display device.

Next, FIG. 7 illustrates a timing chart in which the image signal DATA_2$n$−1 is shown together with the sampling signals R1, G1, and B1 in the timing chart of FIG. 6 and advantages of this embodiment based on the level of the potential of each signal are described in detail. Note that the sampling signal in FIG. 7 is illustrated based on the connection relation of the circuit and the image signal input in FIGS. 5A and 5B. In the timing chart of FIG. 7, as described in FIG. 6, since the video signal DATA_2$n$−1 is a non-inverted video signal in the period T1 of the period $T_m$, the potential level of the sampling signal R1 is the first high power supply potential VH1. In addition, since the video signal DATA_2$n$−1 is a non-inverted video signal in the period T1 of the period $T_m$, the potential level of the sampling signal G1 is the first low power supply potential VL1. Moreover, since the video signal DATA_2$n$−1 is a non-inverted video signal in the period T1 of the period $T_m$, the potential level of the sampling signal B1 is the first low power supply potential VL1. Accordingly, the thin film transistor 107_1 is turned on, whereby the wiring 108_1 and the wiring $S_1$ are brought into electrical continuity In addition, the thin film transistor 107_2 and the thin film transistor 107_3 are turned off, whereby the wiring 108_2 and the wiring S2 are brought out of electrical continuity and the wiring 108_3 and the wiring S3 are brought out of electrical continuity. In this manner, the video signal DATA_2$n$1 is written to, among pixels that are connected to the wiring S1, a pixel that belongs to a selected mth row in the period T1 of the period $T_m$.

In the case where the thin film transistor 107_1 is brought into conduction in the period T1 of the period $T_m$, a voltage applied between the gate and the source of the thin film transistor, that is, a difference between the first high power supply potential VH1 which is a potential level applied to the gate of the thin film transistor and the potential level VDH which is the maximum potential level of the non-inverted video signal is Vgs1 like in FIG. 4. Also, in the case where the thin film transistor 107_1 is brought out of conduction in the period T1 of the period $T_m$, voltage applied between the gate and the source of the thin film transistor, that is, a difference between the first low power supply potential VL1 which is a potential level applied to the gate of the thin film transistor and the potential level 0 which is the minimum potential level of the non-inverted video signal is Vgs2 like in FIG. 4.

In addition, also in the periods T2 and T3 of the period $T_m$, like in the period T1 of the period $T_m$, voltage Vgs1 is applied when the gate and the source of the thin film transistor are brought into electrical continuity and a voltage Vgs2 is applied when the gate and the source of the thin film transistor are brought out of electrical continuity, so that a video signal is written to a predetermined pixel. Note that in a period when the video signal has the first low power supply potential VL1 in FIG. 6 and FIG. 7, the first low power supply potential VL1 may be replaced with the second low power supply potential VL2 as long as the thin film transistor is out of conduction. Note that as shown in FIG. 6 and FIG. 7, when the video signal has the first low power supply potential VL1 in the first period and has the second low power supply potential VL2 in the second period, a voltage applied between the gate and the source when the thin film transistor is brought out of conduction can be constant.

In the period T1 of the period $T_{m+1}$, the potential level of the sampling signal R1 is the second high power supply potential VH2 because the video signal DATA_2$n$−1 is an inverted video signal. In addition, in the period T1 of the period $T_{m+1}$, the potential level of the sampling signal G1 is the second low power supply potential VL2 because the video signal DATA_2$n$−1 is an inverted video signal. Moreover, in the period T1 of the period $T_{m+1}$, the potential level of the sampling signal B1 is the second low power supply potential VL2 because the video signal DATA_2$n$−1 is an inverted video signal. As a result, like in the period T1 of the period $T_m$, the thin film transistor 107_1 is turned on, so that the wiring 108_1 and the wiring $S_1$ are brought into electrical continuity. Further, like in the period T1 of the period $T_m$, the thin film transistor 107_2 and the thin film transistor 107_3 are turned off, so that the wiring 108_2 and the wiring $S_2$ are brought out of electrical continuity and the wiring 108_3 and the wiring $S_3$ are brought out of electrical continuity. In this manner, the video signal DATA_2$n$−1 is written to, among pixels that are connected to the wiring $S_1$, a pixel that belongs to a selected (m+1)th row.

In the case where the thin film transistor 107_1 is brought into conduction in the period T1 of the period $T_{m+1}$, a voltage applied between the gate and the source of the thin film transistor, that is, a difference between the second high power supply potential VH2 which is a potential level applied to the gate of the thin film transistor and the potential level 0 which is the maximum potential level of the inverted video signal is Vgs1 like in FIG. 4. Also, in the case where the thin film transistor 107_1 is brought out of conduction in the period T1 of the period $T_{m+1}$, a voltage applied between the gate and the source of the thin film transistor, that is, a difference between the second low power supply potential VL2 which is a potential level applied to the gate of the thin film transistor and the potential level VDL which is the minimum potential level of the inverted video signal is Vgs2 like in FIG. 4. In other words, in the period $T_m$ and the period $T_{m+1}$ which are different from each other, a voltage applied between the gate and the source of the thin film transistor is Vgs1 when the thin film transistor is on and the voltage applied between the gate and the source of the thin film transistor is Vgs2 when the thin film transistor is off, so that the potential of each sampling signal is adjusted.

In addition, also in the periods T2 and T3 of the period $T_{m+1}$, like in the period T1 of the period $T_{m+1}$, a voltage Vgs1 is applied when the gate and the source of the thin film transistor are brought into electrical continuity and a voltage Vgs2 is applied when the gate and the source of the thin film transistor are brought out of electrical continuity, so that a video signal is written to a predetermined pixel.

That is, as described with reference to FIG. 4 and FIG. 7, in the structure of the signal line driver circuit of the display device in this embodiment, supply of the video signal to the pixel portion can be controlled as follows; in the case where a non-inverted video signal and an inverted video signal are input to the pixel portion in the first period and the second period, respectively, a first signal serving as the first high power supply potential and the first low power supply potential is supplied to the thin film transistor of the switch circuit portion in the first period; and a second signal serving as the second high power supply potential and the second low power supply potential is supplied to the thin film transistor of the switch circuit portion in the second period. Therefore, in the case where a display element that requires inversion driving, such as a liquid crystal display element, is used, a voltage applied between the gate and the source of the thin film transistor of the switch circuit portion can be constant. Thus, it is not necessary that the size of the transistor be large in consideration of a decrease in current flowing to the thin film transistor due to a shift of the threshold voltage of the thin film transistor which is caused by a voltage excessively applied. That is, a thin film transistor included in an analog switch of the signal line driver circuit can be made small and charge and discharge of the signal line can be adequately performed. In addition, since the level of a voltage applied between the source and the drain of the transistor can be constant, the frame of the display device can be made small without a change in a time for charge and discharge of the signal line even if the transistor is designed small.

Note that the contents described in each drawing in this embodiment can be freely combined with or replaced with the contents described in any of other embodiments as appropriate.

Embodiment 2

In this embodiment, one example of a method for manufacturing a thin film transistor, which can be applied to Embodiment 1, will be described using FIGS. 8A to 8C and FIGS. 9A to 9C.

Here, it is preferable that all the thin film transistors formed over one substrate have the same conductivity type because the number of steps can be reduced. In view of this, a method for manufacturing an n-channel thin film transistor will be described in this embodiment.

Figure 8A:
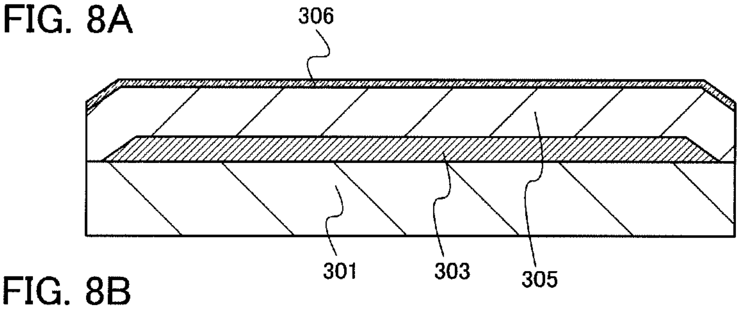
FIGS. 8A to 8C are diagrams illustrating one embodiment of a manufacturing method of a thin film transistor.

As illustrated in FIG. 8A, a gate electrode 303 is formed over a substrate 301. Next, a gate insulating layer 305 covering the gate electrode 303 is formed and then a first semiconductor layer 306 is formed.

As the substrate 301, in addition to a glass substrate and a ceramic substrate, a plastic substrate with heat resistance that can resist a process temperature in this manufacturing step or the like can be used. In the case where the substrate does not need a light-transmitting property, a substrate obtained by providing an insulating layer on a surface of a substrate of a metal such as a stainless steel alloy may be used. As a glass substrate, for example, an alkali-free glass substrate of barium borosilicate glass, aluminoborosilicate glass, aluminosilicate glass, or the like may be used. Further, as for the substrate 301, a glass substrate with any of the following sizes can be used: the 3rd generation (550 mm×650 mm), the 3.5th generation (600 mm×720 mm or 620 mm×750 mm), the 4th generation (680×880 mm or 730 mm×920 mm), the 5th generation (1100 mm×1300 mm), the 6th generation (1500 mm×1850 mm), the 7th generation (1870 mm×2200 mm), the 8th generation (2200 mm×2400 mm), the 9th generation (2400 mm×2800 mm or 2450 mm×3050 mm), or the 10th generation (2950 mm×3400 mm).

The gate electrode 303 can be formed in a single layer or a stacked layer using a metal material such as molybdenum, titanium, chromium, tantalum, tungsten, aluminum, copper, neodymium, or scandium, or an alloy material which includes any of these materials as a main component. Alternatively, a semiconductor layer typified by polycrystalline silicon doped with an impurity element such as phosphorus, or an AgPdCu alloy may be used.

For example, as a layered structure of two layers of the gate electrode 303, a layered structure of two layers in which a molybdenum layer is stacked over an aluminum layer, a layered structure of two layers in which a molybdenum layer is stacked over a copper layer, a layered structure of two layers in which a titanium nitride layer or a tantalum nitride layer is stacked over a copper layer, or a layered structure of two layers in which a titanium nitride layer and a molybdenum layer are stacked is preferable. As a three-layer structure for the gate electrode 303, a layered structure of a tungsten layer or a tungsten nitride layer, a layer of an alloy of aluminum and silicon or an alloy of aluminum and titanium, and a titanium nitride layer or a titanium layer is preferable. When a metal layer functioning as a barrier layer is stacked over a layer with low electric resistance, electric resistance can be reduced and diffusion of a metal element from the metal layer into the semiconductor layer can be prevented.

In order to improve adhesion between the gate electrode 303 and the substrate 301, a layer of a nitride of any of the aforementioned metal materials may be provided between the substrate 301 and the gate electrode 303.

The gate electrode 303 can be formed as follows: a conductive layer is formed over the substrate 301 by a sputtering method or a vacuum evaporation method, a mask is formed over the conductive layer by a photolithography method, an inkjet method, or the like, and then the conductive layer is etched using the mask. Further, the gate electrode 303 can be formed by discharging a conductive nanopaste of silver, gold, copper, or the like over the substrate by an inkjet, method and baking the conductive nanopaste. Here, a conductive layer is formed over the substrate 301 and then etched using a resist mask which is formed through a first photolithography process, so that the gate electrode 303 is formed.

Note that, in the photolithography process, a resist may be formed over the entire surface of the substrate. Alternatively, a resist may be printed by a printing method on a region where a resist mask is to be formed, and then, the resist may be exposed to light, so that a resist can be saved and cost reduction can be achieved. Further alternatively, instead of exposing a resist to light by using a light-exposure machine, a laser beam direct drawing apparatus may be used to expose a resist to light.

When side surfaces of the gate electrode 303 are tapered, disconnection of the semiconductor layer and the wiring layer formed over the gate electrode 303 at a step portion can be prevented. In order to make the side surfaces of the gate electrode 303 tapered, etching is performed while a resist mask is being reduced.

In addition, through the step of forming the gate electrode 303, a gate wiring (a scan line) and a capacitor wiring can also be formed at the same time. Note that a "scan line" means a wiring which selects a pixel, while a "capacitor wiring" means a wiring which is connected to one of electrodes of a capacitor in a pixel. However, this embodiment is not limited thereto and the gate electrode 303 and one of or both the gate wiring and the capacitor wiring may be formed in separate steps.

The gate insulating layer 305 can be formed with a single layer or a stacked layer using any of a silicon oxide layer, a silicon nitride layer, a silicon oxynitride layer, and a silicon nitride oxide layer.

In this specification, silicon oxynitride contains more oxygen than nitrogen, and in the case where measurements are performed using Rutherford backscattering spectrometry (RBS) and hydrogen forward scattering (HFS), silicon oxynitride preferably includes oxygen, nitrogen, silicon, and hydrogen at 50 at. % to 70 at. %, 0.5 at. % to 15 at %, 25 at. % to 35 at. %, and 0.1 at. % to 10 at. %, respectively. Further, silicon nitride oxide contains more nitrogen than oxygen, and in the case where measurements are performed using RBS and HFS, silicon nitride oxide preferably contains oxygen, nitrogen, silicon, and hydrogen at 5 at. % to 30 at. %, 20 to 55 at. %, 25 to 35 at. %, and 10 to 30 at. %, respectively. Note that percentages of nitrogen, oxygen, silicon, and hydrogen fall within the ranges given above, where the total number of atoms contained in the silicon oxynitride or the silicon nitride oxide is defined as 100 at. %.

Further, by forming a silicon oxide layer by a CVD method using an organosilane gas as an uppermost surface of the gate insulating layer 305, the crystallinity of the first semiconductor layer which is formed later can be improved, so that an on-state current and field-effect mobility of the thin film transistor can be increased. As an organosilane gas, a silicon-containing compound such as tetraethoxysilane (TEOS) (chemical formula: $Si(OC_2H_5)_4$), tetramethylsilane (TMS) (chemical formula: $Si(CH_3)_4$), tetramethylcyclotetrasiloxane (TMCTS), octamethylcyclotetrasiloxane (OMCTS), hexamethyldisilazane (HMDS), triethoxysilane (chemical formula: $SiH(OC_2H_5)_3$), or trisdimethylaminosilane (chemical formula: $SiH(N(CH_3)_2)_3$) can be used.

The first semiconductor layer 306 is formed using a microcrystalline semiconductor layer. A microcrystalline semiconductor layer is forming using, typically, a microcrystalline silicon layer, a microcrystalline silicon-germanium layer, a microcrystalline germanium layer, or the like. Alternatively, a microcrystalline silicon layer containing phosphorus, arsenic, or antimony, a microcrystalline silicon germanium layer containing phosphorus, arsenic, or antimony, a microcrystalline germanium layer containing phosphorus, arsenic, or antimony, or the like may be used. Note that boron may be added to the first semiconductor layer 306 in order to control a threshold voltage of the thin film transistor.

A microcrystalline semiconductor included in the microcrystalline semiconductor layer is a semiconductor having a crystal structure (including a single crystal and a polycrystal). A microcrystalline semiconductor is a semiconductor having a third state that is stable in terms of free energy and is a crystalline semiconductor having short-range order and lattice distortion, in which columnar or needle-like crystals having a grain size of from 2 nm to 200 nm, preferably from 10 nm to 80 nm, more preferably from 20 nm to 50 nm have grown in a direction normal to the substrate surface. Therefore, a crystal grain boundary is formed at the interface of the columnar or needle-like crystals in some cases.

Microcrystalline silicon which is a typical example of the microcrystalline semiconductor has a peak of Raman spectrum which is shifted to a lower wave number than 520 $cm^{-1}$ that represents single crystal silicon. That is, the peak of the Raman spectrum of the microcrystalline silicon exists between 520 $cm^{-1}$ which represents single crystal silicon and 480 $cm^{-1}$ which represents amorphous silicon. The microcrystalline semiconductor contains hydrogen or halogen of at least 1 at. % to terminate a dangling bond. Moreover, a rare gas element such as helium, argon, krypton, or neon may be contained to further promote lattice distortion, so that stability of the structure of micro crystals is enhanced and a favorable microcrystalline semiconductor can be obtained. Such a microcrystalline semiconductor is disclosed in, for example, U.S. Pat. No. 4,409,134.

Further, it is preferable that the concentration of oxygen and nitrogen contained in the microcrystalline semiconductor layer measured by secondary ion mass spectrometry be less than $1\times10^{18}$ atoms/$cm^3$ because crystallinity of a microcrystalline semiconductor layer can be improved.

Figure 8B:
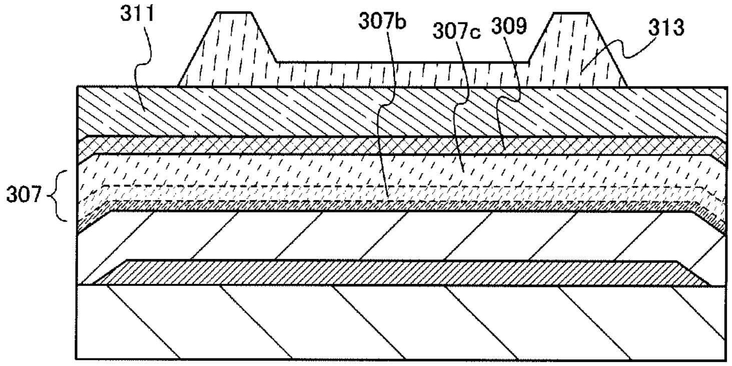
Figure 8C:
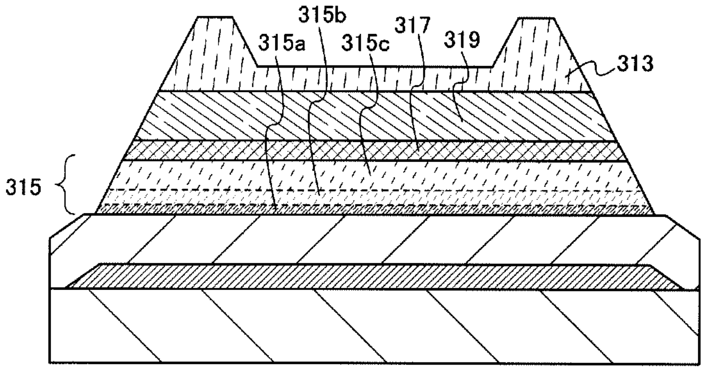

Note that in FIGS. 8A to 8C, the first semiconductor layer 306 is illustrated as a layer; however, semiconductor particles may be dispersed over the gate insulating layer 305 instead. When the size of the semiconductor particles is 1 nm to 30 nm and the density of the semiconductor particles is less than $1\times10^{13}/cm^2$, preferably less than $1\times10^{10}/cm^2$, the semiconductor particles can be formed separately. In that case, a mixed region 307*b* that is formed later is in contact with the semiconductor particles and the gate insulating layer 305. Alternatively, after forming microcrystalline semiconductor particles for the first semiconductor layer 306 over the gate insulating layer 305, a microcrystalline semiconductor layer may be deposited over the microcrystalline semiconductor particles, whereby the microcrystalline semiconductor layer having high crystallinity even at the interface of the gate insulating layer 305 can be formed.

The thickness of the first semiconductor layer 306 is preferably 3 nm to 100 nm, more preferably 5 nm to 50 nm. This is because an on-state current of the thin film transistor is reduced if the first semiconductor layer 306 is too thin. In addition, this is because, if the first semiconductor layer 306 is too thick, an off-state current is increased when the thin film transistor operates at high temperatures. The thickness of the first semiconductor layer 306 is set to 3 nm to 100 nm, preferably 5 nm to 50 nm, whereby an on-state current and an off-state current of the thin film transistor can be controlled.

The first semiconductor layer 306 is formed by glow discharge plasma with a mixture of a deposition gas including silicon or germanium and hydrogen. Alternatively, the first semiconductor layer 306 is formed by glow discharge plasma with a mixture of a deposition gas including silicon or germanium, hydrogen, and a rare gas such as helium, neon, or krypton. Microcrystalline silicon, microcrystalline silicon germanium, microcrystalline germanium, or the like is formed using a mixed gas which is obtained by diluting the deposition gas containing silicon or germanium with hydrogen whose flow rate is 10 to 2000 times, preferably 10 to 200 times that of the deposition gas. The deposition temperature in that case is preferably a room temperature to 300° C., more preferably, 200° C. to 280° C.

As typical examples of the deposition gas containing silicon or germanium, silane ($SiH_4$), disilane ($Si_2H_6$), germane ($GeH_4$), and digermane ($Ge_2H_6$) are given.

When the gate insulating layer 305 is formed using a silicon nitride layer, in the case where the first semiconductor layer 306 is a microcrystalline semiconductor layer, an amorphous semiconductor region is likely to be formed at an early stage of deposition, so that crystallinity of the microcrystalline semiconductor layer is low and electric characteristics of the thin film transistor are poor. Therefore, when the gate insulating layer 305 is formed using a silicon nitride layer, a microcrystalline semiconductor layer is preferably deposited under the condition that the dilution rate of the deposition gas containing silicon or germanium is high or under the low temperature condition. Typically, the high dilution rate condition in which the flow rate of hydrogen is 200 to 2000 times, more preferably 250 to 400 times that of the deposition gas containing silicon or germanium is preferable. In addition, the low temperature condition in which the temperature for deposition of the microcrystalline semiconductor layer is 200° C. to 250° C. is preferable. When the high dilution rate condition or the low temperature condition is employed, early nuclear generation density is increased, an amorphous component over the gate insulating layer is reduced, and crystallinity of the microcrystalline semiconductor layer is improved.

By using a rare gas such as helium, argon, neon, krypton, or xenon as a source gas for the first semiconductor layer 306, the deposition rate of the first semiconductor layer 306 can be increased. In addition, as the deposition rate is increased, the amount of impurities mixed in the first semiconductor layer 306 is reduced; thus, the crystallinity of the first semiconductor layer 306 can be improved. Accordingly, an on-state current and field-effect mobility of the thin film transistor are increased and throughput of the thin film transistor can also be increased.

In addition, before the first semiconductor layer 306 is formed, impurity elements in the treatment chamber of the CVD apparatus are removed by introducing a deposition gas containing silicon or germanium while exhausting the air in the treatment chamber, so that the amount of the impurity elements in the gate insulating layer 305 and the first semiconductor layer 306 of the thin film transistor, which are formed later, can be reduced, and thus, electric characteristics of the thin film transistor can be improved.

Alternatively, before forming the first semiconductor layer 306, a surface of the gate insulating layer 305 may be exposed to oxygen plasma, hydrogen plasma, or the like.

Next, as illustrated in FIG. 8B, a second semiconductor layer 307 is formed over the first semiconductor layer 306. Here, a structure including the mixed region 307*b* and a region 307*c* containing an amorphous semiconductor is illustrated as the second semiconductor layer 307. Then, an impurity semiconductor layer 309 and a conductive layer 311 are formed over the second semiconductor layer 307. After that, a resist mask 313 is formed over the conductive layer 311.

The second semiconductor layer 307 including the mixed region 307*b* and the region 307*c* containing the amorphous semiconductor can be formed under a condition that a crystal grows partly by using the first semiconductor layer 306 as a seed crystal.

The second semiconductor layer 307 is formed by glow discharge plasma using a mixture of a deposition gas containing silicon or germanium, hydrogen, and a gas containing nitrogen. Examples of the gas containing nitrogen include ammonia, nitrogen, nitrogen fluoride, nitrogen chloride, chloroamine, fluoroamine, and the like. Glow discharge plasma can be generated as in the case of the first semiconductor layer 306.

In this case, a flow ratio of the deposition gas containing silicon or germanium to hydrogen is the same as that for forming a microcrystalline semiconductor layer as in the case of forming the first semiconductor layer 306, and a gas containing nitrogen is used for the source gas, whereby crystal growth can be further suppressed compared to the deposition condition of the first semiconductor layer 306. As a result, the mixed region 307*b* and the region 307*c* containing the amorphous semiconductor, which is formed with a well-ordered semiconductor layer having fewer defects and a steep tail slope in a level at a band edge in the valence band, can be formed in the second semiconductor layer 307.

Here, a typical example of a condition for forming the second semiconductor layer 307 is as follows. The flow rate of hydrogen is 10 to 2000 times, preferably, 10 to 200 times that of the deposition gas containing silicon or germanium. Note that in a typical example of a normal condition for forming an amorphous semiconductor layer, the flow rate of hydrogen is 0 to 5 times that of the deposition gas containing silicon or germanium.

A rare gas such as helium, neon, argon, xenon, or krypton is introduced into the source gas of the second semiconductor layer 307, whereby the deposition rate of the second semiconductor layer 307 can be increased.

The thickness of the second semiconductor layer 307 is preferably 50 nm to 350 nm, more preferably, 120 nm to 250 nm.

At an early stage of deposition of the second semiconductor layer 307, since a gas containing nitrogen is contained in the source gas, the crystal growth is partly suppressed; therefore, while conical or pyramidal microcrystalline semiconductor regions grow, an amorphous semiconductor region filling a region between the conical or pyramidal microcrystalline semiconductor regions is formed. Such a region where both the microcrystalline semiconductor region and the amorphous semiconductor region exist is referred to as the mixed region 3076. Further, crystal growth of the conical or pyramidal microcrystalline semiconductor region is stopped and thus a microcrystalline semiconductor region is not formed but only an amorphous semiconductor region is formed. Such a region where a microcrystalline semiconductor region is not formed but only an amorphous semiconductor region is formed is referred to as the mixed region 307*c* containing the amorphous semiconductor. Before the conical or pyramidal microcrystalline semiconductor region grows, a microcrystalline semiconductor layer is deposited over the entire surface of the first semiconductor layer 306 using the first semiconductor layer 306 as a seed crystal in some cases.

Here, a gas containing nitrogen is contained in the source gas of the second semiconductor layer 307, and the second semiconductor layer 307 including the mixed region 307*b* and the region 307*c* containing the amorphous semiconductor is formed. However, another method for forming the second semiconductor layer 307 shown as follows may be used: a surface of the first semiconductor layer 306 is exposed to a gas containing nitrogen so that nitrogen is adsorbed to the surface of the first semiconductor layer 306 and then the second semiconductor layer 307 is formed using a deposition gas containing silicon or germanium and hydrogen for the source gas, thereby forming the second semiconductor layer 307 including the mixed region 307*b* and the region 307*c* containing an amorphous semiconductor.

The impurity semiconductor layer 309 is formed by glow discharge plasma using a mixture of a deposition gas containing silicon, hydrogen, and phosphine (diluted with hydrogen or silane) in the reaction chamber of the plasma CVD apparatus. Amorphous silicon to which phosphorus is added or microcrystalline silicon to which phosphorus is added is formed by diluting the deposition gas including silicon with hydrogen. In the case of manufacturing a p-channel thin film transistor, as the impurity semiconductor layer 309, amorphous silicon to which boron is added by glow discharge plasma or microcrystalline silicon to which boron is added by glow discharge plasma may be formed using diborane instead of phosphine.

Here, a structure of the second semiconductor layer 307 formed between the gate insulating layer 305 and the impurity semiconductor layer 309 is described with reference to FIGS. 10A and 10B, FIG. 11, and FIGS. 12A and 12B. FIGS.

Figure 11:
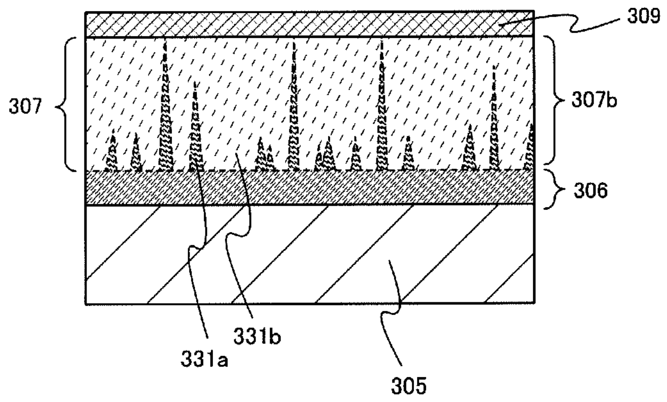
FIG. 11 is a diagram illustrating one embodiment of a manufacturing method of a thin film transistor.
Figure 12A:
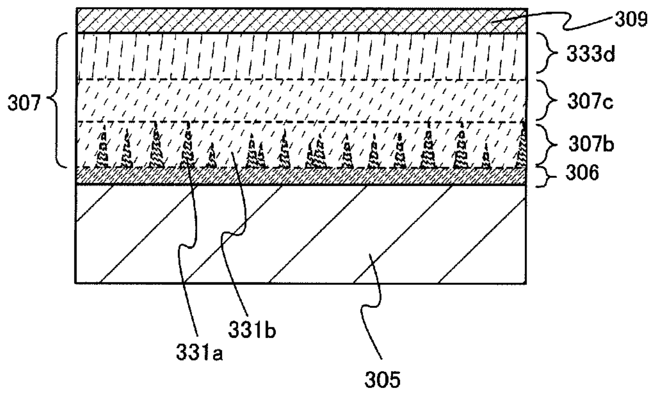
FIGS. 12A and 12B are diagrams each illustrating one embodiment of a manufacturing method of a thin film transistor.
Figure 12B:
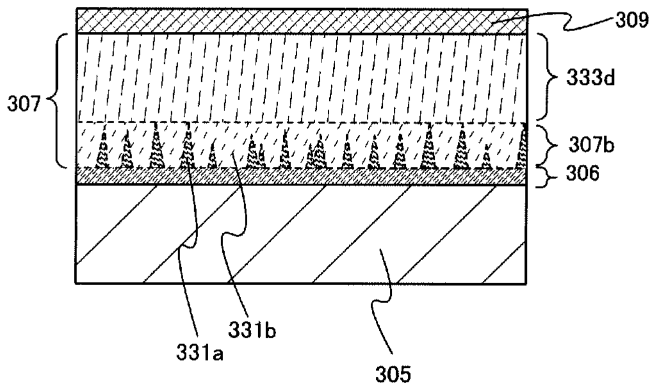

10A and 10B, FIG. 11, and FIGS. 12A and 12B each show an enlarged view of the second semiconductor layer 307 formed between the gate insulating layer 305 and the impurity semiconductor layer 309

Figure 10A:
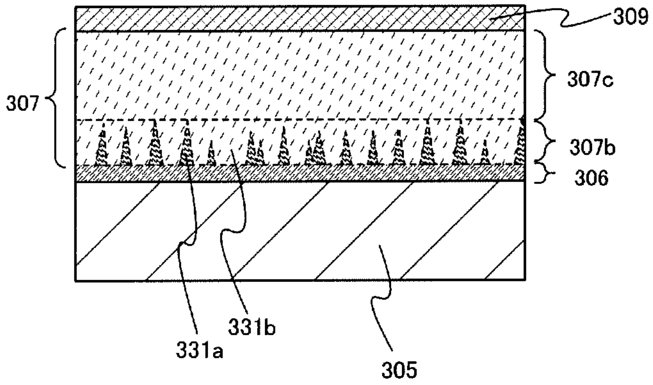
FIGS. 10A and 10B are diagrams each illustrating one embodiment of a manufacturing method of a thin film transistor.

As shown in FIG. 10A, the mixed region 307*b* includes a microcrystalline semiconductor region 331*a* which extends convexly from the surface of the first semiconductor layer 306 and an amorphous semiconductor region 331*b* which fills spaces in the microcrystalline semiconductor region 331*a*.

The microcrystalline semiconductor region 331*a* is formed using a microcrystalline semiconductor which has convexities whose tops are sharpened in direction to the region 307*c* containing the amorphous semiconductor from the gate insulating layer 305 (i.e., the convexities have a conical or pyramidal form). Note that the microcrystalline semiconductor region 331*a* may be formed using a microcrystalline semiconductor which has convexities whose widths increase in direction to the region 307*c* containing the amorphous semiconductor from the gate insulating layer 305 (i.e., the convexities have an inverse conical or pyramidal form).

In addition, the amorphous semiconductor region 331*b* which is contained in the mixed region 307*b* may include a semiconductor crystal grain having a diameter of more than or equal to 1 nm and less than or equal to 10 nm, preferably more than or equal to 1 nm and less than or equal to 5 nm.

Figure 10B:
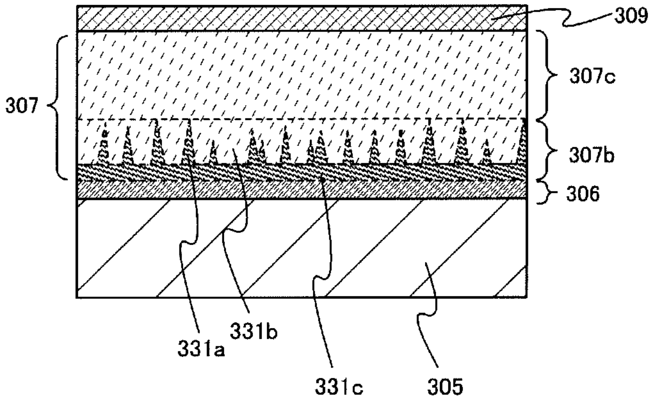

Moreover, in some cases, as shown in FIG. 10B, the mixed region 307*b* is formed by consecutively depositing the microcrystalline semiconductor region 331*c* over the first semiconductor layer 306 to have a predetermined thickness and forming the microcrystalline semiconductor region 331*a* which has convexities whose tops are sharpened in direction to the region 307*c* containing the amorphous semiconductor from the gate insulating layer 305 (i.e., the convexities has a conical or pyramidal form).

The amorphous semiconductor region 331*b* included in the mixed region 307*b* illustrated in FIGS. 10A and 10B is made of a semiconductor having substantially the same quality as the region 307*c* containing the amorphous semiconductor.

In view of the above, an interface between a region formed using a microcrystalline semiconductor and a region formed using an amorphous semiconductor may be referred to as an interface between the microcrystalline semiconductor region 331*a* and the amorphous semiconductor region 331*b* in the mixed region 307*b*. Therefore, a boundary between the microcrystalline semiconductor and the amorphous semiconductor may have unevenness or a zigzag in cross section.

Moreover, in the case where the microcrystalline semiconductor region 331*a* is a convex semiconductor crystal grain whose top is sharpened in direction to the region 307*c* containing the amorphous semiconductor from the gate insulating layer 305 (i.e., the semiconductor crystal grain has a conical or pyramidal form), the percentage of the microcrystalline semiconductor in the mixed region 3076 is higher in the vicinity of the first semiconductor layer 306 than the percentage of the microcrystalline semiconductor in the mixed region 307*b* in the vicinity of the region 307*c* containing the amorphous semiconductor. Crystal growth of the microcrystalline semiconductor region 331*a* proceeds from a surface of the first semiconductor layer 306 in direction of film thickness. However, by making the flow rate of hydrogen to silane lower than that in a deposition condition of the first semiconductor layer 306 while gas containing nitrogen is contained in a source gas, crystal growth of the microcrystalline semiconductor region 331*a* is suppressed, whereby a semiconductor crystal grain has a conical or pyramidal form and the amorphous semiconductor is soon deposited. This is caused by the fact that the solid solubility of nitrogen in the microcrystalline semiconductor region is lower than that in the amorphous semiconductor region.

The sum of the thicknesses of the first semiconductor layer 306 and the mixed region 307*b*, that is, the distance between an interface of the gate insulating layer 305 and the top of the projection (the convexity) in the mixed region 307*b* is more than or equal to 3 nm and less than or equal to 410 nm, preferably more than or equal to 20 nm and less than or equal to 100 nm. By setting the sum of the thicknesses of the first semiconductor layer 306 and the mixed region 307*b* to more than or equal to 3 nm and less than or equal to 410 nm, preferably more than or equal to 20 nm and less than or equal to 100 nm, an off-state current of the thin film transistor can be reduced.

As described above, the region 307*c* containing the amorphous semiconductor is a semiconductor with substantially the same quality as the amorphous semiconductor region 331*b* and contains nitrogen. Further, the region 307*c* containing the amorphous semiconductor may include a semiconductor crystal grain having a diameter of more than or equal to 1 nm to less than or equal to 10 nm, preferably more than or equal to 1 nm to less than or equal to 5 nm. Here, the region 307*c* containing the amorphous semiconductor is a semiconductor layer having lower energy at an Urbach edge and a small amount of the absorption spectrum of defects, measured by a constant photocurrent method (CPM) or photoluminescence spectroscopy, compared with a conventional amorphous semiconductor layer. That is, compared with the conventional amorphous semiconductor layer, the region 307*c* containing the amorphous semiconductor is a well-ordered semiconductor layer which has fewer defects and whose tail of a level at a band edge in the valence band is steep. Since the tail of a level at a band edge in the valence band is steep in the region 307*c* containing the amorphous semiconductor, the band gap gets wider, and tunneling current does not easily flow. Therefore, by providing the region 307*c* containing the amorphous semiconductor on the back channel side, off-state current of the thin film transistor can be reduced. In addition, by providing of the region 307*c* containing the amorphous semiconductor, on-state current and field effect mobility of the thin film transistor can be increased.

A peak region of spectrum of the region 307*c* containing the amorphous semiconductor, which is measured by low temperature photoluminescence spectroscopy, is greater than or equal to 1.31 eV and less than or equal to 1.39 eV. Note that a peak region of spectrum obtained by measuring a microcrystalline semiconductor layer, typically a microcrystalline silicon layer with low-temperature photoluminescence spectroscopy is greater than or equal to 0.98 eV and less than or equal to 1.02 eV. Therefore, the region 307*c* containing an amorphous semiconductor is different from a microcrystalline semiconductor layer.

Note that amorphous silicon is a typical example of the amorphous semiconductor in the region 307*c* containing the amorphous semiconductor.

In addition, nitrogen contained in the mixed region 307*b* and the region 307*c* containing the amorphous semiconductor may be an NH group or an $NH_2$ group.

Moreover, as shown in FIG. 11, a region between the first semiconductor layer 306 and the impurity semiconductor layer 309 may be wholly the mixed region 307*b*. In other words, the second semiconductor layer 307 may be the mixed region 307*b*. In the structure shown in FIG. 11, the percentage of the microcrystalline semiconductor region 331*a* in the mixed region 307*b* is preferably lower than the percentage of the microcrystalline semiconductor region 331*a* in the mixed region 307*b* in the structure shown in FIGS. 10A and 10B.

Further, the percentage of the microcrystalline semiconductor region 331*a* in the mixed region 3076 is preferably low in a region between a source region and a drain region, that is, a region where carriers flow. Accordingly, an off-state current of the thin film transistor can be reduced. Furthermore, in the mixed region 307*b*, a resistance in vertical direction (thickness direction) obtained when a voltage is applied to a source and drain electrodes formed of a wiring 325 in an on-state, that is, a resistance between a semiconductor layer and the source region or the drain region can be decreased, whereby the on-state current and the field effect mobility of the thin film transistor can be increased.

Note that in FIG. 11, the mixed region 307*b* may include the microcrystalline semiconductor region 331*c* like in FIG. 10B.

Alternatively, as shown in FIG. 12A, a conventional amorphous semiconductor region 333*d* may be provided between the region 307*c* containing the amorphous semiconductor and the impurity semiconductor layer 309. That is, the second semiconductor layer 307 may include the mixed region 307*b*, the region 307*c* containing the amorphous semiconductor, and the amorphous semiconductor region 333*d*. Alternatively, as shown in FIG. 12B, the conventional amorphous semiconductor region 333*d* may be provided between the mixed region 307*b* and the impurity semiconductor layer 309. That is, the second semiconductor layer 307 may be the mixed region 3076 and the amorphous semiconductor region 333*d*. By employing the structure shown in FIG. 12A or 12B, the off-state current of the thin film transistor can be reduced.

Note that in FIGS. 12A and 12B, the mixed region 307*b* may include the microcrystalline semiconductor region 331*c* like in FIG. 10B.

Since the mixed region 3076 includes the microcrystalline semiconductor region 331*a* having a conical or pyramidal form, a resistance in vertical direction (film thickness direction) obtained when a voltage is applied between a source and drain electrodes in an on-state, that is, a resistance of the first semiconductor layer 306, the mixed region 307*b*, and the region 307*c* containing the amorphous semiconductor can be reduced.

In addition, as described above, nitrogen contained in the mixed region 307*b* may be typically an NH group or an $NH_2$ group. This is because the number of defects is decreased when an NH group or an $NH_2$ group contained in the microcrystalline semiconductor region 331*a* is combined with dangling bonds of silicon atoms at an interface between a plurality of microcrystalline semiconductor regions, an interface between the microcrystalline semiconductor region 331*a* and the amorphous semiconductor region 331*b*, or an interface between the first semiconductor layer 306 and the amorphous semiconductor region 331*b*. Accordingly, the nitrogen concentration of the second semiconductor layer 307 is set at greater than or equal to $1\times10^{19}$ atoms/$cm^3$ and less than or equal to $1\times10^{21}$ atoms/$cm^3$, preferably, greater than or equal to $1\times10^{20}$ atoms/$cm^3$ and less than or equal to $1\times10^{21}$ atoms/$cm^3$, and therefore, the dangling bonds of the silicon atoms can be easily combined with an NH group, so that a carrier can also flow easily. Alternatively, the dangling bonds of the semiconductor atoms at the aforementioned interface are terminated with the $NH_2$ group, so that the defect level disappears. As a result, resistance in vertical direction (film thickness direction) obtained when the thin film transistor is in an on state and voltage is applied between the source electrode and drain electrode is reduced. That is, field effect mobility and on-state current of the thin film transistor are increased.

Further, the concentration of oxygen in the mixed region 307*b* is made lower than that of nitrogen in the mixed region 307*b*, whereby bonds which interrupt carrier transfer due to defects at the interface between semiconductor crystal grains and at the interface between the microcrystalline semiconductor region 331*a* and the amorphous semiconductor region 331*b* can be reduced.

Thus, by forming a channel region by using the first semiconductor layer 306 and providing the region 307*c* containing the amorphous semiconductor between the channel region and the impurity semiconductor layer 309, the off-state current of the thin film transistor can be reduced. In addition, by providing the mixed region 307*b* and the region 307*c* containing the amorphous semiconductor, the off-state current of the thin film transistor can be further reduced while the on-state current and the electric field effect mobility of the thin film transistor is increased. This is because the mixed region 3076 includes the microcrystalline semiconductor region 331*a* having a conical or pyramidal form, the region 307*c* containing the amorphous semiconductor has few defects, and the mixed region 307*b* is formed using a well-ordered semiconductor layer in which tail of a level at a band edge in the valence band is steep.

The conductive layer 311 can be formed with a single layer or a stacked layer using any of aluminum, copper, titanium, neodymium, scandium, molybdenum, chromium, tantalum, tungsten, and the like. The conductive layer 311 may be formed using an aluminum alloy to which an element to prevent a hillock is added (an aluminum-neodymium alloy or the like which can be used for the gate electrode 303). The conductive layer 311 may also have a layered structure in which a layer which is in contact with the impurity semiconductor layers 309 is formed using titanium, tantalum, molybdenum, or tungsten, or nitride of any of these elements and aluminum or an aluminum alloy is formed thereover. Furthermore, a layered structure in which each of upper and lower surfaces of aluminum or an aluminum alloy is covered with titanium, tantalum, molybdenum, tungsten, or nitride of any of these elements may also be employed.

The conductive layer 311 is formed by a CVD method, a sputtering method, or a vacuum evaporation method. Alternatively, the conductive layer 311 may be formed by discharging a conductive nanopaste of silver, gold, copper, or the like by a screen printing method, an ink-jet method, or the like and baking the conductive nanopaste.

The resist mask 313 is formed through a second photolithography process. The resist mask 313 has regions with different thicknesses. Such a resist mask can be formed using a multi-tone mask. The multi-tone mask is preferably used because the number of photomasks used and the number of manufacturing steps can be reduced. In this embodiment, the resist mask formed using the multi-tone mask can be used in a step of forming patterns of the first semiconductor layer 306 and the second semiconductor layer 307 and a step of forming a source region and a drain region.

The multi-tone mask is a mask with which exposure can be performed with the amount of light in a plurality of levels. Typically, exposure is performed with the amount of light in three levels: an exposure region, a half-exposure region, and a non-exposure region. By one light exposure and development step with the use of a multi-tone mask, a resist mask with plural thicknesses (typically, two kinds of thicknesses) can be formed. Therefore, by the use of a multi-tone mask, the number of photomasks can be reduced.

Next, with the use of the resist mask 313, the first semiconductor layer 306, the second semiconductor layer 307, the impurity semiconductor layer 309, and the conductive layer 311 are etched. Through this step, the first semiconductor layer 306, the second semiconductor layer 307, the impurity semiconductor layer 309, and the conductive layer 311 are separated for each element, to form a third semiconductor layer 315, an impurity semiconductor layer 317, and a conductive layer 319. Note that the third semiconductor layer 315 includes a microcrystalline semiconductor layer 315*a* obtained by etching the first semiconductor layer 306, a mixed layer 315*b* obtained by etching the mixed region 307*b* of the second semiconductor layer 307, and a layer 315*c* containing an amorphous semiconductor, which is obtained by etching the region 307*c* containing the amorphous semiconductor of the second semiconductor layer 307 (FIG. 8C).

Next, the resist mask 313 is reduced in size to form a separated resist mask 323. Ashing using oxygen plasma may be performed in order that the resist mask is made to recede. Here, ashing is performed on the resist mask 313 so that the resist mask 313 is separated over the gate electrode. Accordingly, the resist mask 323 can be formed (see FIG. 9A).

Figure 9A:
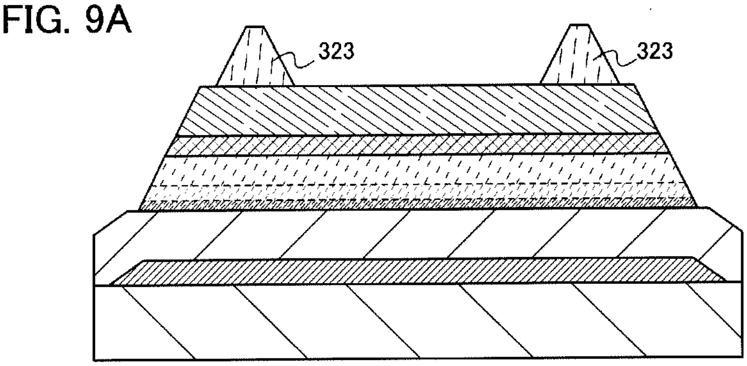
FIGS. 9A to 9C are diagrams illustrating one embodiment of a manufacturing method of a thin film transistor.
Figure 9B:
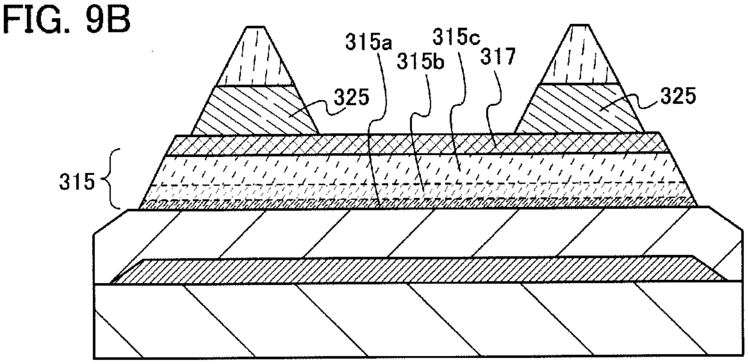
Figure 9C:
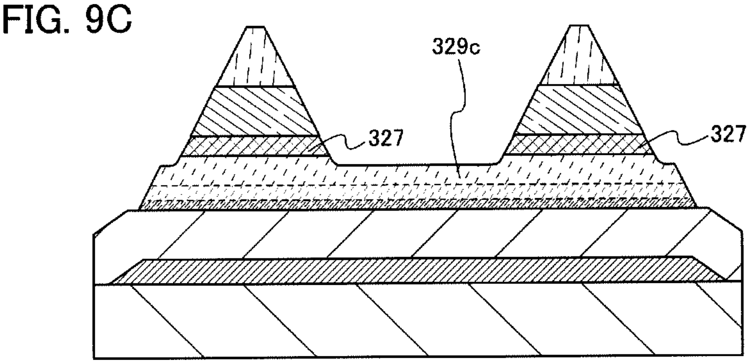

Next, the conductive layer 319 is etched using the resist mask 323, whereby wirings 325 serving as a source and drain electrodes are formed (see FIG. 9B). Here, dry etching is employed. The wirings 325 serve not only as a source and drain electrodes but also as signal lines. However, without limitation thereto, a signal line may be provided separately from the source and drain electrodes.

Next, with the use of the resist mask 323, the region 315*c* containing an amorphous semiconductor of the third semiconductor layer 315 and the impurity semiconductor layer 317 are each partly etched. Here, dry etching is employed. Through the above steps, the region 329*c* containing the amorphous semiconductor which has a depression on its surface and the impurity semiconductor layers 327 serving as source and drain regions are formed (see FIG. 9C). After that, the resist mask 323 is removed.

Here, the conductive layer 319, the region 315*c* containing the amorphous semiconductor, and the impurity semiconductor layer 317 are each partly subjected to dry etching. Accordingly, the conductive layer 319 is anisotropically etched and thus, the side surfaces of the wirings 325 are substantially aligned with the side surfaces of the impurity semiconductor layers 327.

Alternatively, the impurity semiconductor layer 323 and the region 315*c* containing the amorphous semiconductor may be partly etched after removal of the resist mask 323. By the etching, the impurity semiconductor layer 327 is etched using the wirings 325 as masks, so that the side surfaces of the wirings 325 are substantially aligned with the side surfaces of the impurity semiconductor layers 327.

Alternatively, the conductive layer 311 may be subjected to wet etching and the region 315*c* containing the amorphous semiconductor and the impurity semiconductor layer 317 may be subjected to dry etching. With wet etching, the conductive layer 311 is isotropically etched and is reduced in direction of the inner side of the resist mask 323 so that the wirings 325 are formed. Moreover, a shape in which side surfaces of the impurity semiconductor layer 327 are on the outer side of the side surface of the wiring 325 is formed.

Next, dry etching may be performed after removal of the resist mask 323. A condition of dry etching is set so that a surface of an exposed portion of the region 329*c* containing the amorphous semiconductor is not damaged and the etching rate with respect to the region 329*c* containing the amorphous semiconductor is low. In other words, a condition which gives almost no damages to the exposed surface of the region 329*c* containing the amorphous semiconductor and hardly reduces the thickness of the exposed region of the region 329*c* containing the amorphous semiconductor is applied. As an etching gas, $Cl_2$, $CF_4$, $N_2$, or the like is typically used. There is no particular limitation on an etching method and an inductively coupled plasma (ICP) method, a capacitively coupled plasma (CCP) method, an electron cyclotron resonance (ECR) method, a reactive ion etching (ME) method, or the like can be used.

Next, a surface of the region 329*c* containing the amorphous semiconductor may be subjected to plasma treatment typified by water plasma treatment, ammonia plasma treatment, nitrogen plasma treatment, or the like.

The water plasma treatment can be performed by generating plasma using a gas containing water as its main component typified by water vapor, which is introduced into the reaction space.

As described above, after formation of the impurity semiconductor layers 327, dry etching is further performed under such a condition that the region 329*c* containing the amorphous semiconductor is not damaged, whereby an impurity such as a residue existing on the surface of the exposed portion of the region 329*c* containing the amorphous semiconductor can be removed. By the plasma treatment, insulation between the source region and the drain region can be ensured, and thus, in a thin film transistor which is completed, off-state current can be reduced, and variation in electric characteristics can be reduced.

Through the above steps, a thin film transistor including a gate insulating layer having fewer defects can be manufactured using the small number of masks with high productivity. Further, a thin film transistor whose electric characteristics are less likely to vary and be degraded can be manufactured with high productivity. In addition, the manufacturing process of the thin film transistor in this embodiment can be applied to the display device in Embodiment 1. Thus, in addition to the effect of this embodiment, the following effect can be obtained: in the switch circuit portion in the driver circuit portion, the thin film transistor can be made small without consideration of a decrease in a current flowing to the thin film transistor due to a shift of a threshold voltage of the thin film transistor which is caused by a voltage applied; therefore, charge and discharge of the signal line can be adequately performed and frame of the display device can be made small.

Note that the contents described in each drawing in this embodiment can be freely combined with or replaced with the contents described in any of other embodiments as appropriate.

Embodiment 3

In this embodiment, examples of electronic devices will be described.

The display device in any of the above embodiments can be applied to a variety of electronic devices (including game machines). Examples of electronic devices are a television set (also referred to as a television or a television receiver), a monitor of a computer, a camera such as a digital camera or a digital video camera, a digital photo frame, a mobile phone handset (also referred to as a mobile phone or a mobile phone device), a portable game machine, a portable information terminal, an audio reproducing device, a large game machine such as a pinball machine, and the like.

Figure 13A:
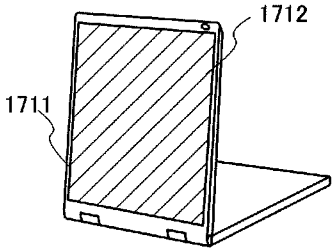
FIGS. 13A to 13C are diagrams each illustrating an electronic device including a display device.

FIG. 13A is an example of a digital photo frame provided with a display device which uses a liquid crystal display element. For example, in the digital photo frame illustrated in FIG. 13A, a display portion 1712 is incorporated in a housing 1711. The display portion 1712 can display various images.

For example, the display portion 1712 can display data of an image taken with a digital camera or the like and function as a normal photo frame.

Figure 13B:
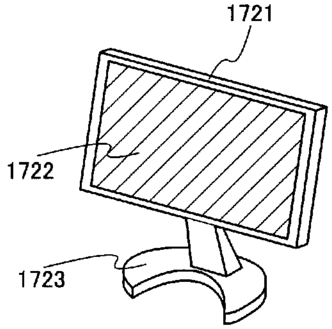

FIG. 13B is an example of a television set provided with a display device which uses a liquid crystal display element. In the television set illustrated in FIG. 13B, a display portion 1722 is incorporated in a housing 1721. The display portion 1722 can display an image. Further, the housing 1721 is supported by a stand 1723 here. The display device described in any of the above embodiments can be used in the display portion 1722.

Figure 13C:
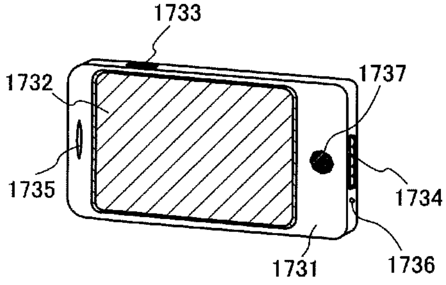

FIG. 13C is an example of a mobile phone handset provided with a display device which uses a liquid crystal display element. The mobile phone handset illustrated in FIG. 13C is provided with a display portion 1732 incorporated in a housing 1731, an operation button 1733, an operation button 1737, an external connection port 1734, a speaker 1735, a microphone 1736, and the like.

The display portion 1732 of the mobile phone handset illustrated in FIG. 13C is a touchscreen. When the display portion 1732 is touched with a finger or the like, contents displayed on the display portion 1732 can be controlled. Further, operations such as making calls and texting can be performed by touching the display portion 1732 with a finger or the like.

In this embodiment, examples of electronic devices each including the display device described in any of the above embodiments are described. The electronic device includes the display device in Embodiment 1. Thus, in the switch circuit portion in the driver circuit portion, the thin film transistor can be made small without consideration of a decrease in a current flowing to the thin film transistor due to a shift of a threshold voltage of the thin film transistor which is caused by a voltage applied to the thin film transistor; therefore, charge and discharge of the signal line can be adequately performed and frame of the display device can be made small. Moreover, as described in Embodiment 2, in the case where a microcrystalline semiconductor is used for a channel region of the thin film transistor, increase in the size of the display device, reduction in cost, improvement in yield, or the like can be achieved. Further, by the use of a microcrystalline semiconductor for the channel region of the thin film transistor, degradation of characteristics of the thin film transistor can be suppressed, so that the life of the display device can be extended.

Note that the contents described in each drawing in this embodiment can be freely combined with or replaced with the contents described in any of other embodiments as appropriate.

This application is based on Japanese Patent Application serial no. 2009-171457 filed with Japan Patent Office on Jul. 22, 2009, the entire contents of which are hereby incorporated by reference.

What is claimed is:

1. A display device comprising:

a pixel portion to which a non-inverted video signal is input in a first period and to which an inverted video signal is input in a second period; and a signal line driver circuit comprising a switch circuit portion for controlling output of the non-inverted video signal and the inverted video signal to the pixel portion, wherein the switch circuit portion comprises first to third transistors, each of the first to third transistors comprising a gate, a first terminal, and a second terminal, wherein the first terminal of the first transistor is electrically connected to the first terminal of the second transistor and the first terminal of the third transistor, wherein the second terminal of the first transistor, the second terminal of the second transistor, and the second terminal of the third transistor are electrically connected to a first signal line, a second signal line, a third signal line, respectively, wherein the gate of the first transistor, the gate of the second transistor, and the gate of the third transistor are configured to be applied with a first signal and a second signal so that the non-inverted video signal and the inverted video signal are applied to the pixel portion, wherein the first signal serves as a first high power supply potential and a first low power supply potential in the first period, wherein the second signal serves as a second high power supply potential and a second low power supply potential in the second period, wherein the first high power supply potential is higher than the second high power supply potential, and wherein the first low power supply potential is higher than the second low power supply potential.

2. The display device according to claim 1, wherein the first terminal of the first transistor is directly connected to the first terminal of the second transistor and the first terminal of the third transistor.

3. The display device according to claim 1, wherein the first signal line, the second signal line, and the third signal line are electrically connected to a first pixel, a second pixel, and a third pixel that each display a different color from one another.

4. An electronic device comprising the display device according to claim 1.

5. A display device comprising:

a pixel portion comprising first to sixth pixels which are arranged in a line in this order;

a first switch circuit portion comprising first to third transistors each of which comprises a gate, a first terminal, and a second terminal, wherein the first terminal of the first transistor is electrically connected to the first terminal of the second transistor and the first terminal of the third transistor;

a second switch circuit portion comprising fourth to sixth transistors each of which comprises a gate, a first terminal, and a second terminal, wherein the first terminal of the fourth transistor is electrically connected to the first terminal of the fifth transistor and the first terminal of the sixth transistor;

a sampling signal output circuit electrically connected to the gates of the first to sixth transistors and configured to apply first to fourth potentials to each of the gates of the first to sixth transistors; and a video signal output circuit configured to apply a non-inverted video signal and an inverted video signal to the first pixel, third pixel, and the fifth pixel through the first transistor, the second transistor, and the third transistor, respectively, and to the second pixel, fourth pixel, and sixth pixel through the fourth transistor, the fifth transistor, and the sixth transistor, respectively, wherein the first potential is higher than the third potential and the second potential is higher than the fourth potential, wherein the sampling signal output circuit is configured so that: in a first period, the first potential is applied to the gate of the first transistor; the second potential is applied to the gate of the fifth transistor; the third potential is applied to the gates of the second transistor and the third transistor; and the fourth potential is applied to the gates of the fourth transistor and the sixth transistor, while the non-inverted video signal is applied to the first terminals of the first to third transistors, and the inverted video signal is applied to the first terminals of the fourth to sixth transistors, and wherein the sampling signal output circuit is configured so that: in a second period which is sequential to the first period, the first potential is applied to the gate of the third transistor; the second potential is applied to the gate of the fourth transistor; the third potential is applied to the gates of the first transistor and the second transistor; and the fourth potential is applied to the gates of the fifth transistor and the sixth transistor, while the non-inverted video signal is applied to the first terminals of the first to third transistors, and the inverted video signal is applied to the first terminals of the fourth to sixth transistors.

6. The display device according to claim 5, wherein the first terminal of the first transistor is directly connected to the first terminal of the second transistor and the first terminal of the third transistor.

7. The display device according to claim 5, wherein the first terminal of the fourth transistor is directly connected to the first terminal of the fifth transistor and the first terminal of the sixth transistor.

8. An electronic device comprising the display device according to claim 5.

* * * * *

UNITED STATES PATENT AND TRADEMARK OFFICE

CERTIFICATE OF CORRECTION

PATENT NO. : 8,593,387 B2
APPLICATION NO. : 12/838150
DATED : November 26, 2013
INVENTOR(S) : Hiroyuki Miyake It is certified that error appears in the above-identified patent and that said Letters Patent is hereby corrected as shown below:

In the Specification

Column 8, line 33, after "R," insert --G,--;

Column 8, line 34, after "109_2, and" replace "109_2" with --109_3--;

Column 8, line 53, before "is" replace "in" with --*m*--;

Column 8, line 62, replace "in" with --*m*--;

Column 10, line 18, replace "T" with --$T_m$--;

Column 10, line 66, before "voltage" insert --a--;

Column 13, line 52, replace "DATA_2*n*1" with --DATA_2*n*-1--;

Column 13, line 65, before "voltage" insert --a--;

Column 14, line 5, before "voltage" insert --a--;

Column 20, line 25, replace "3076" with --307b--;

Column 21, line 53, replace "3076" with --307b--;

Column 23, line 2, replace "3076" with --307b--;

Column 23, line 27, replace "3076" with --307b--;

Column 23, line 33, replace "3076" with --307b--;

Signed and Sealed this
Fifteenth Day of April, 2014

Michelle K. Lee

Michelle K. Lee
*Deputy Director of the United States Patent and Trademark Office*

Column 24, line 16, replace “3076” with --307b--;

Column 26, line 4, replace “(ME)” with --(RIE)--;

In the Claims

Column 28, line 4, in claim 1 before “a third” insert --and--.